(12) United States Patent
Abiko et al.

(10) Patent No.: US 7,787,353 B2
(45) Date of Patent: Aug. 31, 2010

(54) OPTICAL RECORDING MEDIUM AND METHOD FOR MANUFACTURING SAME

(75) Inventors: Toru Abiko, Miyagi (JP); Etsuro Ikeda, Miyagi (JP); Nobuaki Furuichi, Miyagi (JP); Fuminori Takase, Miyagi (JP)

(73) Assignee: Sony Corporation, Tokyo (JP)

( * ) Notice: Subject to any disclaimer, the term of this patent is extended or adjusted under 35 U.S.C. 154(b) by 1278 days.

(21) Appl. No.: 10/509,308

(22) PCT Filed: Jan. 22, 2004

(86) PCT No.: PCT/JP2004/000536
§ 371 (c)(1),
(2), (4) Date: Sep. 27, 2004

(87) PCT Pub. No.: WO2004/070717
PCT Pub. Date: Aug. 19, 2004

(65) Prior Publication Data
US 2005/0129899 A1    Jun. 16, 2005

(30) Foreign Application Priority Data
Feb. 6, 2003    (JP) .............................. 2003-030114

(51) Int. Cl.
*G11B 7/24*    (2006.01)
(52) U.S. Cl. .................................. 369/275.1
(58) Field of Classification Search ............... None
See application file for complete search history.

(56) References Cited

U.S. PATENT DOCUMENTS

| 6,096,399 A | 8/2000 | Yoshinari et al. | |
|---|---|---|---|
| 6,218,292 B1 * | 4/2001 | Foote ........................ | 438/636 |
| 6,606,293 B1 * | 8/2003 | Okada et al. ................... | 369/94 |
| 2001/0005350 A1 * | 6/2001 | Kitaura et al. ................. | 369/94 |
| 2001/0012257 A1 * | 8/2001 | Suzuki et al. ................. | 369/94 |
| 2002/0024913 A1 * | 2/2002 | Kojima et al. ................. | 369/94 |
| 2002/0150772 A1 | 10/2002 | Nakai et al. | |
| 2003/0044719 A1 * | 3/2003 | Katoh et al. ........... | 430/270.13 |
| 2003/0138669 A1 * | 7/2003 | Kojima et al. .......... | 428/694 ST |
| 2003/0161988 A1 * | 8/2003 | Hwang et al. .............. | 428/64.4 |

FOREIGN PATENT DOCUMENTS

JP    2002-008266    1/2002

(Continued)

*Primary Examiner*—Joseph H Feild
*Assistant Examiner*—Henok G Heyi
(74) *Attorney, Agent, or Firm*—Sonnenschein Nath & Rosenthal LLP

(57) ABSTRACT

In an optical recording medium 1 having a configuration in which on one main surface of a substrate 2, a reflective layer 3, a lower dielectrics layer 4, a recording layer 5, an upper dielectrics layer 6 and a light transmissive layer 7 are sequentially laminated, the lower dielectrics layer 4 is formed of a first lower dielectrics layer and a second lower dielectrics layer that inhibits a material that constitutes the first lower dielectrics layer and a material that constitutes the reflective layer 3 from reacting, and the upper dielectrics layer 6 is formed of a first upper dielectrics layer and a second upper dielectrics layer that inhibits a material that constitutes the first upper dielectrics layer and a material that constitutes the light transmissive layer 7 from reacting.

26 Claims, 14 Drawing Sheets

FOREIGN PATENT DOCUMENTS

| | | |
|---|---|---|
| JP | 2002-15464 | 1/2002 |
| JP | 2002-015464 | 1/2002 |
| JP | 2002-074741 | 3/2002 |
| JP | 2002-74746 | 3/2002 |
| JP | 2002-74747 | 3/2002 |
| JP | 2002237088 A * | 8/2002 |
| JP | 2002-269812 | 9/2002 |
| JP | 2002260283 A * | 9/2002 |
| JP | 2002-237088 | 10/2002 |
| JP | 2002-288876 | 10/2002 |
| JP | 2002-324335 | 11/2002 |
| JP | 2002-329348 | 11/2002 |
| JP | 2003-6930 | 1/2003 |
| JP | 2003-016687 | 1/2003 |
| JP | 2003-019867 | 1/2003 |
| JP | 2003-22570 | 1/2003 |
| JP | 2003006930 A * | 1/2003 |
| JP | 2003006930 | 10/2003 |
| JP | 2004-95034 | 3/2004 |
| WO | WO02/76757 | 3/2002 |

* cited by examiner

Fig. 5

| | REFLECTIVE LAYER [nm] | SECOND LOWER DIELECTRICS LAYER [nm] | FIRST LOWER DIELECTRICS LAYER [nm] | RECORDING LAYER [nm] | FIRST UPPER DIELECTRICS LAYER [nm] | SECOND UPPER DIELECTRICS LAYER [nm] | COMPOSITION OF REFLECTIVE FILM |
|---|---|---|---|---|---|---|---|
| EXAMPLE 1 | 60 | 8 | 6 | 10 | 8 | 40 | Ag0.4at%Nd0.6at%Cu |
| EXAMPLE 2 | 80 | 8 | 6 | 10 | 8 | 40 | Ag0.4at%Nd0.6at%Cu |
| EXAMPLE 3 | 120 | 8 | 6 | 10 | 8 | 40 | Ag0.4at%Nd0.6at%Cu |
| EXAMPLE 4 | 140 | 8 | 6 | 10 | 8 | 40 | Ag0.4at%Nd0.6at%Cu |
| EXAMPLE 5 | 100 | 4 | 6 | 10 | 8 | 40 | Ag0.4at%Nd0.6at%Cu |
| EXAMPLE 6 | 100 | 8 | 6 | 10 | 8 | 40 | Ag0.4at%Nd0.6at%Cu |
| EXAMPLE 7 | 100 | 14 | 6 | 10 | 8 | 40 | Ag0.4at%Nd0.6at%Cu |
| EXAMPLE 8 | 100 | 18 | 6 | 10 | 8 | 40 | Ag0.4at%Nd0.6at%Cu |
| EXAMPLE 9 | 100 | 8 | 4 | 10 | 8 | 40 | Ag0.4at%Nd0.6at%Cu |
| EXAMPLE 10 | 100 | 8 | 10 | 10 | 8 | 40 | Ag0.4at%Nd0.6at%Cu |
| EXAMPLE 11 | 100 | 8 | 12 | 10 | 8 | 40 | Ag0.4at%Nd0.6at%Cu |
| EXAMPLE 12 | 100 | 8 | 6 | 6 | 8 | 40 | Ag0.4at%Nd0.6at%Cu |
| EXAMPLE 13 | 100 | 8 | 6 | 8 | 8 | 40 | Ag0.4at%Nd0.6at%Cu |
| EXAMPLE 14 | 100 | 8 | 6 | 16 | 8 | 40 | Ag0.4at%Nd0.6at%Cu |
| EXAMPLE 15 | 100 | 8 | 6 | 18 | 8 | 40 | Ag0.4at%Nd0.6at%Cu |
| EXAMPLE 16 | 100 | 8 | 6 | 10 | 4 | 40 | Ag0.4at%Nd0.6at%Cu |
| EXAMPLE 17 | 100 | 8 | 6 | 10 | 10 | 40 | Ag0.4at%Nd0.6at%Cu |
| EXAMPLE 18 | 100 | 8 | 6 | 10 | 12 | 40 | Ag0.4at%Nd0.6at%Cu |
| EXAMPLE 19 | 100 | 8 | 6 | 10 | 8 | 30 | Ag0.4at%Nd0.6at%Cu |
| EXAMPLE 20 | 100 | 8 | 6 | 10 | 8 | 36 | Ag0.4at%Nd0.6at%Cu |
| EXAMPLE 21 | 100 | 8 | 6 | 10 | 8 | 46 | Ag0.4at%Nd0.6at%Cu |
| EXAMPLE 22 | 100 | 8 | 6 | 10 | 8 | 50 | Ag0.4at%Nd0.6at%Cu |
| COMPARATIVE EXAMPLE | 100 | 18 | 0 | 10 | 0 | 50 | Ag0.4at%Nd0.6at%Cu |
| EXAMPLE 23 | 100 | 8 | 6 | 10 | 8 | 40 | Ag0.4at%Nd0.6at%Cu |
| EXAMPLE 24 | 100 | 8 | 6 | 10 | 8 | 40 | Ag0.7at%Nd0.9at%Cu |

Fig. 6

| | REFLECTIVE LAYER [nm] | SECOND LOWER DIELECTRICS LAYER [nm] | FIRST LOWER DIELECTRICS LAYER [nm] | RECORDING LAYER [nm] | FIRST UPPER DIELECTRICS LAYER [nm] | SECOND UPPER DIELECTRICS LAYER [nm] | COMPOSITION OF REFLECTIVE FILM |
|---|---|---|---|---|---|---|---|
| EXAMPLE 25 | 100 | 10 | 5 | 12 | 6 | 42 | Ag0.4at%Nd0.6at%Cu |
| EXAMPLE 26 | 100 | 10 | 5 | 12 | 6 | 42 | Ag0.4at%Nd0.6at%Cu |
| EXAMPLE 27 | 100 | 10 | 5 | 12 | 6 | 42 | Ag0.4at%Nd0.6at%Cu |
| EXAMPLE 28 | 100 | 10 | 5 | 12 | 6 | 42 | Ag0.4at%Nd0.6at%Cu |
| EXAMPLE 29 | 100 | 10 | 5 | 12 | 6 | 42 | Ag0.4at%Nd0.6at%Cu |
| EXAMPLE 30 | 100 | 10 | 5 | 12 | 6 | 42 | Ag0.4at%Nd0.6at%Cu |
| EXAMPLE 31 | 100 | 10 | 5 | 12 | 6 | 42 | Ag0.4at%Nd0.6at%Cu |
| EXAMPLE 32 | 100 | 10 | 5 | 12 | 6 | 42 | Ag0.4at%Nd0.6at%Cu |
| EXAMPLE 33 | 100 | 10 | 5 | 12 | 6 | 42 | Ag0.4at%Nd0.6at%Cu |
| EXAMPLE 34 | 100 | 10 | 5 | 12 | 6 | 42 | Ag0.4at%Nd0.6at%Cu |
| EXAMPLE 35 | 100 | 8 | 6 | 10 | 8 | 40 | Ag0.4at%Nd0.6at%Cu |
| EXAMPLE 36 | 100 | 8 | 6 | 10 | 8 | 40 | Ag0.4at%Nd0.6at%Cu |
| EXAMPLE 37 | 100 | 8 | 6 | 10 | 8 | 40 | Ag0.4at%Nd0.6at%Cu |
| EXAMPLE 38 | 100 | 8 | 6 | 10 | 8 | 40 | Ag0.4at%Nd0.6at%Cu |
| EXAMPLE 39 | 100 | 8 | 6 | 10 | 8 | 40 | Ag0.4at%Nd0.6at%Cu |
| EXAMPLE 40 | 100 | 8 | 6 | 10 | 8 | 40 | Ag0.4at%Nd0.6at%Cu |
| EXAMPLE 41 | 100 | 8 | 6 | 10 | 8 | 40 | Ag0.4at%Nd0.6at%Cu |
| EXAMPLE 42 | 100 | 8 | 6 | 10 | 8 | 40 | Ag0.4at%Nd0.6at%Cu |
| EXAMPLE 43 | 100 | 8 | 6 | 10 | 8 | 40 | Ag0.4at%Nd0.6at%Cu |
| EXAMPLE 44 | 100 | 8 | 6 | 10 | 8 | 40 | Ag0.4at%Nd0.6at%Cu |

Fig. 7

| | 1× Ig 12%-24% | 1× MODULATION >0.4 | 1× RECORDING SENSITIVITY <5.2mW | 2× MODULATION >0.4 | 2× RECORDING SENSITIVITY <6.0mW | REPRODUCTION DURABILITY >0.3mW | CORROSION RESISTANCE (80°C 85% 400hr) |
|---|---|---|---|---|---|---|---|
| EXAMPLE 1 | ○ | ○ | ○ | ○ | ○ | ○ | ○ |
| EXAMPLE 2 | ○ | ○ | ○ | ○ | ○ | × | ○ |
| EXAMPLE 3 | ○ | ○ | ○ | ○ | ○ | ○ | ○ |
| EXAMPLE 4 | ○ | ○ | ○ | ○ | ○ | ○ | ○ |
| EXAMPLE 5 | ○ | ○ | ○ | ○ | ○ | ○ | ○ |
| EXAMPLE 6 | ○ | ○ | ○ | ○ | ○ | ○ | × |
| EXAMPLE 7 | ○ | ○ | ○ | ○ | ○ | ○ | ○ |
| EXAMPLE 8 | × | ○ | ○ | ○ | ○ | ○ | ○ |
| EXAMPLE 9 | ○ | ○ | ○ | ○ | ○ | ○ | ○ |
| EXAMPLE 10 | ○ | ○ | ○ | ○ | ○ | ○ | ○ |
| EXAMPLE 11 | × | ○ | ○ | ○ | ○ | × | ○ |
| EXAMPLE 12 | ○ | ○ | ○ | ○ | ○ | × | ○ |
| EXAMPLE 13 | ○ | ○ | ○ | ○ | ○ | ○ | ○ |
| EXAMPLE 14 | ○ | ○ | ○ | ○ | ○ | ○ | ○ |
| EXAMPLE 15 | ○ | ○ | × | ○ | ○ | ○ | ○ |
| EXAMPLE 16 | ○ | ○ | ○ | ○ | ○ | ○ | ○ |
| EXAMPLE 17 | ○ | ○ | ○ | ○ | ○ | ○ | ○ |
| EXAMPLE 18 | ○ | ○ | ○ | ○ | ○ | ○ | ○ |
| EXAMPLE 19 | × | ○ | ○ | ○ | ○ | × | ○ |
| EXAMPLE 20 | ○ | ○ | ○ | ○ | ○ | ○ | ○ |
| EXAMPLE 21 | ○ | ○ | ○ | ○ | ○ | ○ | ○ |
| EXAMPLE 22 | × | ○ | × | × | × | ○ | ○ |
| COMPARATIVE EXAMPLE | ○ | ○ | ○ | ○ | ○ | × | × |
| EXAMPLE 23 | ○ | ○ | ○ | ○ | ○ | ○ | ○ |
| EXAMPLE 24 | ○ | ○ | ○ | ○ | ○ | ○ | ○ |

Fig. 8

| | Ge [at%] | Sb/Te | 1× JITTER <9% | 1× RECORDING SENSITIVITY <5.2mW | 1× JITTER AFTER STORAGE <9% |
|---|---|---|---|---|---|
| EXAMPLE 25 | 4 | 3.2 | × | ○ | ○ |
| EXAMPLE 26 | 4 | 3.4 | ○ | ○ | ○ |
| EXAMPLE 27 | 4 | 3.7 | ○ | ○ | ○ |
| EXAMPLE 28 | 4 | 4 | ○ | × | ○ |
| EXAMPLE 29 | 4 | 4.4 | ○ | × | ○ |
| EXAMPLE 30 | 4 | 4.7 | × | ○ | ○ |
| EXAMPLE 31 | 0 | 3.6 | ○ | ○ | × |
| EXAMPLE 32 | 2 | 3.6 | ○ | ○ | ○ |
| EXAMPLE 33 | 8 | 3.6 | ○ | ○ | ○ |
| EXAMPLE 34 | 10 | 3.6 | × | ○ | ○ |

| | Ge [at%] | Sb/Te | 1× JITTER <12.5% | 1× RECORDING SENSITIVITY <6.0mW | 2× JITTER <12.5% | 2× RECORDING SENSITIVITY <6.0mW | 2× JITTER AFTER STORAGE <12.5% |
|---|---|---|---|---|---|---|---|
| EXAMPLE 35 | 4 | 3.7 | ○ | ○ | × | ○ | — |
| EXAMPLE 36 | 4 | 4 | ○ | ○ | × | ○ | — |
| EXAMPLE 37 | 4 | 4.2 | ○ | ○ | ○ | ○ | — |
| EXAMPLE 38 | 4 | 4.4 | ○ | ○ | ○ | ○ | — |
| EXAMPLE 39 | 4 | 4.8 | × | × | ○ | × | — |
| EXAMPLE 40 | 4 | 5 | ○ | ○ | ○ | ○ | × |
| EXAMPLE 41 | 0 | 4.2 | ○ | ○ | ○ | ○ | ○ |
| EXAMPLE 42 | 2 | 4.2 | ○ | ○ | ○ | ○ | ○ |
| EXAMPLE 43 | 8 | 4.2 | ○ | ○ | × | ○ | ○ |
| EXAMPLE 44 | 10 | 4.2 | | | | | |

80°C 200 hr

OPTICAL RECORDING MEDIUM AND METHOD FOR MANUFACTURING SAME

BACKGROUND OF THE INVENTION

The present invention relates to an optical recording medium and a manufacturing method thereof, in particular, one that can be preferably applicable to an optical recording medium in which laser light is irradiated from a side on which a protective layer is disposed to protect an information signal portion, and thereby the information signal is recorded and reproduced.

In the field of information recording, studies and developments of optical information recording systems have been variously forwarded. The optical information recording system has many advantages in that (1) non-contact recording and/or reproducing can be realized, (2) the recording density more than one digit higher than that of a magnetic recording system can be attained, (3) less expensive and large capacity file can be realized and so on. Accordingly, a wide application from industrial uses to consumer uses is in consideration.

Optical recording media that use the optical information recording system can be categorized into a read-only type, a rewrite type and a write-once type. The read-only type optical recording medium is the most popular optical recording medium at present, and as the optical recording medium, for instance, a CD-DA (CD-Digital Audio), a CD-ROM (Compact Disc Read Only Memory), a DVD-ROM (Digital Versatile Disc-Read Only Memory) and so on can be cited.

The rewrite type optical recording medium is a recording medium in which information can be erased and rewritten and can be categorized into an optical magnetic recording medium and a phase change recording medium. The optical magnetic recording medium is a recording medium that makes use of thermal magnetic recording and magneto-optical reproducing, and, as the optical recording medium, for instance, an MO (Magneto Optical) and MD (Mini Disc) can be cited. On the other hand, the phase change recording medium is an optical recording medium that makes use of a structural phase change between crystalline and amorphous phases, and as the optical recording medium, for instance, a CD-RW (Compact Disc ReWritable) and a DVD-R (Digital Versatile Disc-Recordable) can be cited.

The write-once type optical recording medium is an optical recording medium that allows neither erasing nor rewriting information but allows overwriting in another place, and as the optical recording medium, for instance, a CD-R (Compact Disc Recordable) and a DVD-R (Digital Versatile Disc-Recordable) can be cited.

Furthermore, the optical recording medium can be roughly divided into a single plate type (for instance, CD, CD-R, and CD-RW) and a laminated type (for instance, DVD-ROM, DVD-R, and DVD-RW).

Firstly, as an example of a configuration of a single plate type optical recording medium, configurations of the CD and CD-RW will be shown. The CD has a configuration in which on a transparent substrate on which a concaved pattern is formed in accordance with an information signal, a reflective layer made of aluminum and a protective layer that protects the reflective layer from moisture and oxygen in air are sequentially formed.

The CD-RW has a configuration in which on one main surface of a transparent substrate on which a concave pattern such as a land and a groove is formed, a transparent dielectrics film made of silicon nitride, a phase change recording layer made of a chalcogen compound, a transparent dielectrics layer made of silicon nitride and a reflective layer made of aluminum are sequentially laminated. The recording/reproducing of an information signal is carried out by irradiating light from a transparent substrate side on a phase change recording layer.

In the next place, as an example of a configuration of the laminated type optical recording medium, a configuration of the DVD-RW will be shown. In FIG. 14, a configuration of the DVD-RW is shown. As shown in FIG. 14, a DVD-RW has a configuration in which a substrate 101 on one main surface of which a dielectrics layer 102, a recording layer 103, a dielectrics layer 104 and a reflective layer 105 are sequentially laminated and a substrate 111 on one main surface of which a reflective layer 112 is laminated are laminated through an adhesive layer 120.

In a DVD having such a configuration, by use of a semiconductor laser that outputs laser light having a wavelength of 650 nm and an optical system provided with an object lens having the NA of 0.6, a recording capacity of 4.7 GB corresponding to substantially 8 times that of the CD can be realized. Accordingly, the DVD is used to record versatile data such as videos, music and computer data.

However, in recent years, a next generation optical recording medium that has a capacity further larger than that of the abovementioned existing optical recording medium and can record, on one surface, data corresponding to 4 hours according to the NTSC (National Television System Committee) system is proposed (for instance, Japanese Patent Application No. 09-109660, page 2 to 3).

In the next generation optical recording medium, it is intended, by enabling to record and reproduce for 4 hours as a home video disc recorder, to provide a function as a new recording medium that can replace a video tape recorder (Video Tape Recorder) that is most popular at present.

Furthermore, in the next generation optical recording medium, it is considered, by forming into a shape and size same as that of a digital audio disc on which music data is recorded, to render a product that can be easily used by users familiar to the convenience and handiness of the digital audio disc.

Still furthermore, in the next generation optical recording medium, not only that by forming a shape in disc it can make use of a speedy access that is the biggest advantage of the disc shape and is a recording medium that is small and convenient, but also it is considered to further include various functions such as instantaneous recording and reproducing, trick play and edition.

In order to provide the abovementioned next generation optical recording medium, a recording capacity of 8 GB or more is necessary to be realized. In this connection, it is in study to, with a signal format such as an ECC (Error Correcting Code) system or a modulation system remained in a DVD system as it is, secure a memory capacity of 8 GB or more.

According to the study, in order to realize the recording capacity of 8 GB or more, the numerical aperture NA and a wavelength $\lambda$ of laser light that is used in recording/reproducing an information signal have to satisfy the following equation.

$$4.7 \times (0.65/0.60 \times NA/\lambda)^2 \geq 8$$

When this is rewritten, $NA/\lambda \geq 1.20$ is obtained.

According to a relational equation, in order to realize the recording capacity of 8 GB or more, it is necessary to make a wavelength of the laser light used for recording/reproducing an information signal shorter and also to make NA (numerical aperture) of an object lens larger.

However, when an object lens is made higher in the NA, optical aberration caused by tilt of a disc becomes larger, and thereby a problem in that an allowance of the tilt of the disc surface relative to an optical axis of an optical pickup becomes smaller is caused.

In this connection, a next generation optical recording medium in which on an information signal portion formed on one main surface on a substrate, a light transmissive layer that allows the laser light passing through is formed is proposed. In the optical recording medium, not from a side of the substrate, but from a side of the light transmissive layer formed on the information signal portion, light is irradiated to record and/or reproduce the information signal.

In what follows, an example of a configuration of the next generation optical recording medium will be shown. A next generation read-only type optical recording medium has a configuration in which, for instance, on one main surface on a concaved side of a substrate, a reflective layer made of a metal and a light transmissive layer that is a light transmissive thin layer are sequentially laminated.

A next generation rewrite type optical recording medium has a configuration in which, for instance, on one main surface of a concaved side of a substrate, a reflective layer made of a metal, a recording layer (for instance, optical magnetic recording layer or phase change type recording layer) and a light transmissive layer are sequentially formed.

A next generation phase change recording medium specifically has a configuration as shown below. On one main surface of a substrate on which a concaved portion that becomes a guide groove for guiding a spot light of an optical system when an information signal is recorded and reproduced is formed, a reflective layer, a dielectrics layer, a phase change type recording layer and a dielectrics layer are sequentially laminated to form a recording layer, and further thereon a light transmissive layer is formed.

However, when the present inventors have repeated manufacturing the abovementioned next generation optical recording media, conducted various experiments of the next generation optical recording media and studied variously based on the experimental results, the inventors have come to find a problem in that in the abovementioned next generation optical recording media, excellent signal characteristics and high reliability cannot be obtained.

Furthermore, in recent years, a further improvement in the function such as read-once (recording and simultaneous reproduction) in which, with the recording of a program continuing, a recorded portion can be reproduced is in demand. In order to cope with the demand, with a line speed selected from a range of 4.554 m/s or more and 5.28 m/s or less as a reference, even when a information signal is recorded at a line speed higher than two times the reference, excellent signal characteristics and high reliability are necessary to be obtained.

However, in the abovementioned existing next generation optical recording media, there is a problem in that when an information signal is recorded at a high speed as mentioned above, excellent signal characteristics and high reliability cannot be obtained.

SUMMARY OF THE INVENTION

Accordingly, an object of the present invention is to provide, in an optical recording medium in which by focusing light having a wavelength in a range of 400 nm or more and 410 nm or less with an optical system having a numeral aperture in the range of 0.84 or more and 0.86 or less followed by irradiating through a light transmissive layer on an information signal portion, and thereby a information signal is recorded and reproduced, a optical recording medium that can obtain excellent signal characteristics and high reliability; and a manufacturing method thereof.

Another object of the present invention is to provide, in an optical recording medium in which by focusing light having a wavelength in a range of 400 nm or more and 410 nm or less with an optical system having a numeral aperture in the range of 0.84 or more and 0.86 or less followed by irradiating through the light transmissive layer on the information signal portion, and thereby an information signal is recorded and reproduced, a optical recording medium that can obtain, even when, with a line speed selected from a range of 4.554 m/s or more and 5.28 m/s or less as a reference, a information signal is recorded at a line speed higher than two times the reference, excellent signal characteristics and high reliability; and a manufacturing method thereof.

In order to overcome the above problems, a first invention according to the present invention relates to an optical recording medium that comprises at least a reflective layer, a lower dielectrics layer, a recording layer, an upper dielectrics layer and a light transmissive layer that are sequentially laminated on one main surface of a substrate, wherein light having a wavelength in a range of 400 nm or more and 410 nm or less is focused with an optical system having a numeral aperture in the range of 0.84 or more and 0.86 or less followed by irradiating from a side of the light transmissive layer on the recording layer, and thereby a information signal is recorded and reproduced, wherein the lower dielectrics layer includes a first lower dielectric layer and a second lower dielectrics layer that inhibits a material that constitutes the first lower dielectrics layer and a material that constitutes the reflective layer from reacting; and the upper dielectrics layer includes a first upper dielectric layer and a second upper dielectrics layer that inhibits a material that constitutes the first upper dielectrics layer and a material that constitutes the light transmissive layer from reacting.

A second invention according to the invention relates to a method of manufacturing an optical recording medium that has a configuration in which on one main surface of a substrate at least a reflective layer, a lower dielectrics layer, a recording layer, an upper dielectrics layer and a light transmissive layer are sequentially laminated, wherein light having a wavelength in the range of 400 nm or more and 410 nm or less is focused with an optical system having a numeral aperture in the range of 0.84 or more and 0.86 or less followed by irradiating from a side of the light transmissive layer on the recording layer, and thereby a information signal is recorded and reproduced, comprising:

forming the reflective layer on one main surface of the substrate;

forming the lower dielectrics layer by laminating on the reflective layer a first lower dielectrics layer and a second lower dielectrics layer that inhibits a material that constitutes the first lower dielectrics layer and a material that constitutes the reflective layer from reacting;

forming the recording layer on the lower dielectrics layer;

forming the upper dielectrics layer by laminating on the recording layer a first upper dielectrics layer and a second upper dielectrics layer that inhibits a material that constitutes the first upper dielectrics layer and a material that constitutes the light transmissive layer from reacting; and forming the light transmissive layer on the upper dielectrics layer.

According to the invention, the lower dielectrics layer includes the first lower dielectrics layer and the second lower dielectrics layer that inhibits a material that constitutes the first lower dielectrics layer and a material that constitutes the reflective layer from reacting, and the upper dielectrics layer includes the first upper dielectrics layer and the second upper dielectrics layer that inhibits a material that constitutes the first upper dielectrics layer and a material that constitutes the light transmissive layer from reacting. Accordingly, a material that constitutes the first lower dielectrics layer and a material that constitutes the reflective layer can be inhibited from reacting, and a material that constitutes the first upper dielectrics layer and a material that constitutes the light transmissive layer can be inhibited from reacting.

BRIEF DESCRIPTION OF THE DRAWINGS

FIG. 5 being a table showing conditions of examples 1 through 24;

FIG. 6 being a table showing conditions of examples 25 through 44;

FIG. 7 being a table showing evaluation results of examples 1 through 24;

FIG. 8 being a table showing conditions of examples 25 through 34 and evaluation results thereof;

FIG. 9 being a table showing conditions of examples 35 through 44 and evaluation results thereof;

DETAILED DESCRIPTION OF THE PRESENTLY PREFERRED EMBODIMENTS

Figure 1:
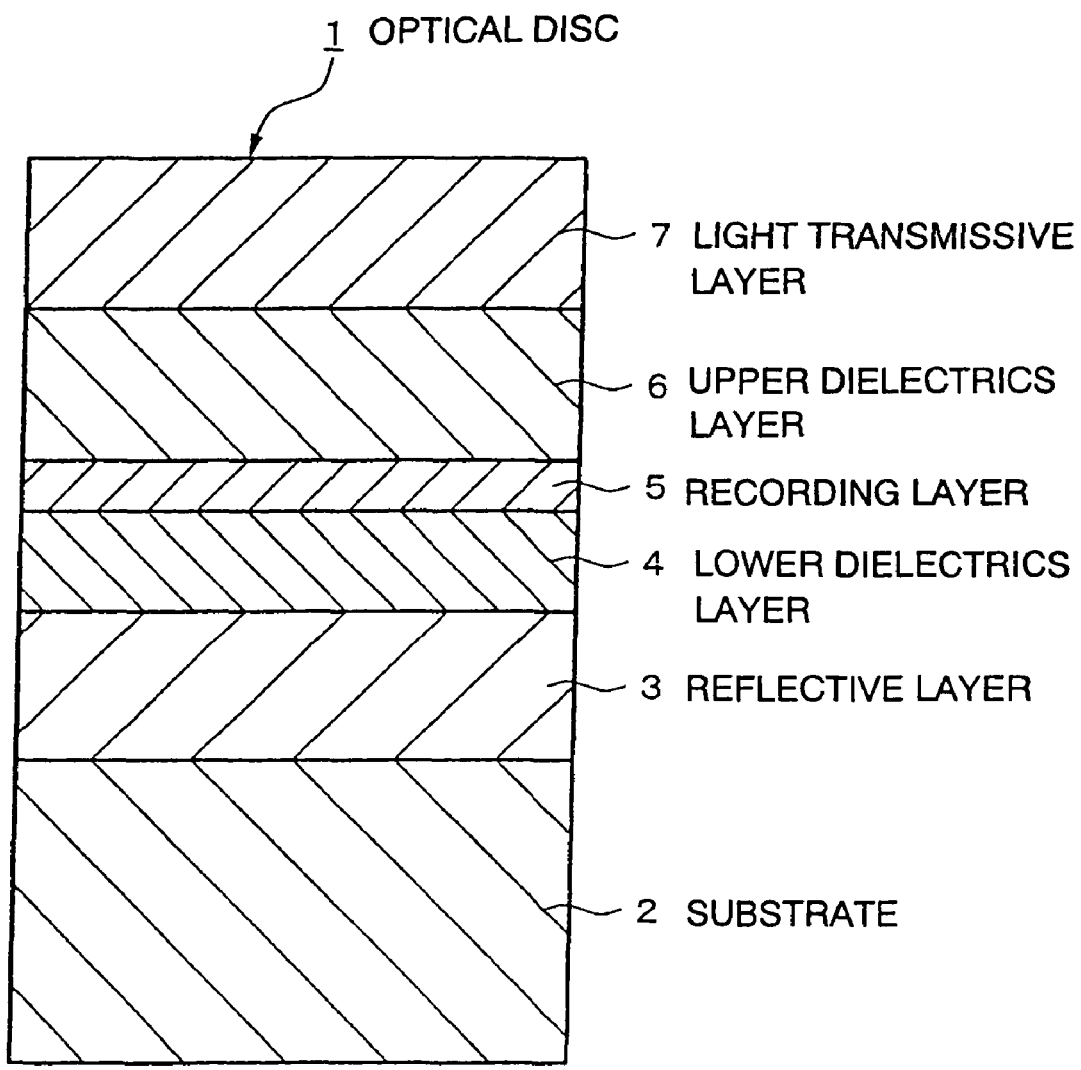
FIG. 1 is a sectional diagram showing an example of a configuration of an optical disc according to one embodiment of the present invention.

In what follows, embodiments of the present invention will be explained with reference to the drawings. In all drawings of the following embodiments, the same or corresponding portions will be given the same reference numerals.

FIG. 1 is a sectional view showing an example of a configuration of an optical disc according to one embodiment of the invention. As shown in FIG. 1, an optical disc 1 according to this one embodiment has a configuration in which on one main surface of a substrate 2, a reflective layer 3, a lower dielectrics layer 4, a recording layer 5, an upper dielectrics layer 6 and a light transmissive layer 7 are sequentially laminated.

In the optical disc according to one of embodiments, when a track pitch P of a guiding groove, the skew $\Theta$ of the substrate 2, the numeral aperture NA of an optical pickup that is used to reproduce and/or record an information signal, a wavelength $\lambda$ of laser light that is used to reproduce and/or record an information signal and a thickness t of the light transmissive layer 7 are made so as to satisfy the following relational equations (1) through (4), a recording capacity of 8 GB or more can be realized.

$$P \leq 0.64 \, (\mu m) \tag{1}$$

$$\Theta \leq \pm 84.115 \, (\lambda/NA^3/t) \tag{2}$$

$$\lambda \leq 0.64 \, (\mu m) \tag{3}$$

and $$NA/\lambda \geq 1.20 \tag{4}$$

Here, the wavelength $\lambda$ is selected from 400 nm or more and 410 nm or less, the numerical aperture NA from 0.84 or more and 0.86 or less, and a data bit length from 0.1035 μm or more and 0.12 μm or less. For instance, the wavelength $\lambda$ is selected at 405 nm, the numerical aperture NA at 0.85, the data bit length at 0.12 μm and the track pitch at 0.32 μm.

In the case of the numerical aperture NA being 0.84 or less and the wavelength $\lambda$ being 410 nm or more, since a spot diameter d ($d \propto \lambda/NA$) becomes larger than a desired diameter, a high recording density that enables the recording capacity of 8 GB or more cannot be realized. On the other hand, in the case of the numerical aperture NA being 0.86 or more and the wavelength $\lambda$ being 400 nm or less, in order to secure an allowance (tilt margin) of tilt of an optical axis from a recording surface, the light transmissive layer 7 has to be made further thinner; accordingly, an error of a thickness of the light transmissive layer 7 can be confined within an allowable range with difficulty. That is, maintenance of the signal quality becomes difficult.

The substrate 2 has an annular shape in which a center hole (not shown in the drawing) is formed at a center. On one main surface on a side where the reflective layer 3 is formed of the substrate 2, a pit row for information reproduction or a concaved portion (not shown in the drawing) that becomes a guiding groove for guiding an optical spot when information is recorded or reproduced is formed. A thickness of the substrate 2 is selected from 0.3 to 1.2 mm, for instance, at 1.1 mm.

As a material of the substrate 2, for instance, a plastics material such as a polycarbonate base resin, a polyolefin base resin or an acrylic resin, or glass can be used. In view of the cost, the plastics material can be preferably used as the material of the substrate 2.

A material of the reflective layer 3 is selected in view of, for instance, the reflectivity and the thermal conduction of the reflective layer 3. That is, it is selected from metal elements, semi-metal elements and compounds or mixtures thereof that have the reflectivity to a wavelength of laser light that is used for recording and reproducing and the thermal conductivity in the range of, for instance, $4.0 \times 10^{-2}$ to $4.5 \times 10^2$ J/m·K·s ($4.0 \times 10^{-4}$ to 4.5 J/cm·K·s). Specifically, as the material of the reflective layer 3, simple bodies such as Al, Ag, Au, Ni, Cr, Ti, Pd, Co, Si, Ta, W, Mo and Ge, or alloys having one of these simple bodies as a main component can be cited. In view of the practicality, among these, Al base, Ag base, Au base, Si base or Ge base materials are preferable. In the case of an alloy being used as the material of the reflective layer 3, for instance, AlCu, AlTi, AlCr, AlCo, AlMgSi, AgPdCu, AgPdTi, AgCuTi, AgPdCa, AgPdMg, AgPdFe, Ag and SiB are preferable.

In the case of the reflective layer 3 being constituted of, for instance, a Ag base alloy made of Ag, Nd and Cu, it is preferably selected so that a content of Nd may be in the range of 0.4 atomic percent or more and 0.7 atomic percent or less and that of Cu may be in the range of 0.6 atomic percent or more and 0.9 atomic percent or less.

Furthermore, a thickness of the reflective layer 3 is preferably selected in the range of 80 nm or more and 140 nm or less, for instance at 100 nm. When the thickness of the reflective layer 3 is set at less than 80 nm, since heat generated in the recording layer 5 cannot be sufficiently diffused, the thermal cooling becomes insufficient, resulting in deterioration in the jitter characteristics due to a reproduction power at the time of reproduction. On the other hand, when the thickness of the reflective layer 3 is set at more than 140 nm, although the thermal characteristics and the optical characteristics are not adversely affected, owing to stress generated in the reflective layer 3, the mechanical characteristics such as the skew are adversely affected, resulting in incapability of obtaining desired characteristics.

The lower dielectrics layer 4 and the upper dielectrics layer 6 are formed by laminating a plurality of dielectrics layers. The laminated dielectrics layer is constituted of materials low in the absorptivity to laser light for use in recording and reproducing, preferably of materials extinction coefficient k of which satisfies the relationship of $0 < k \leq 3$.

Figure 2:
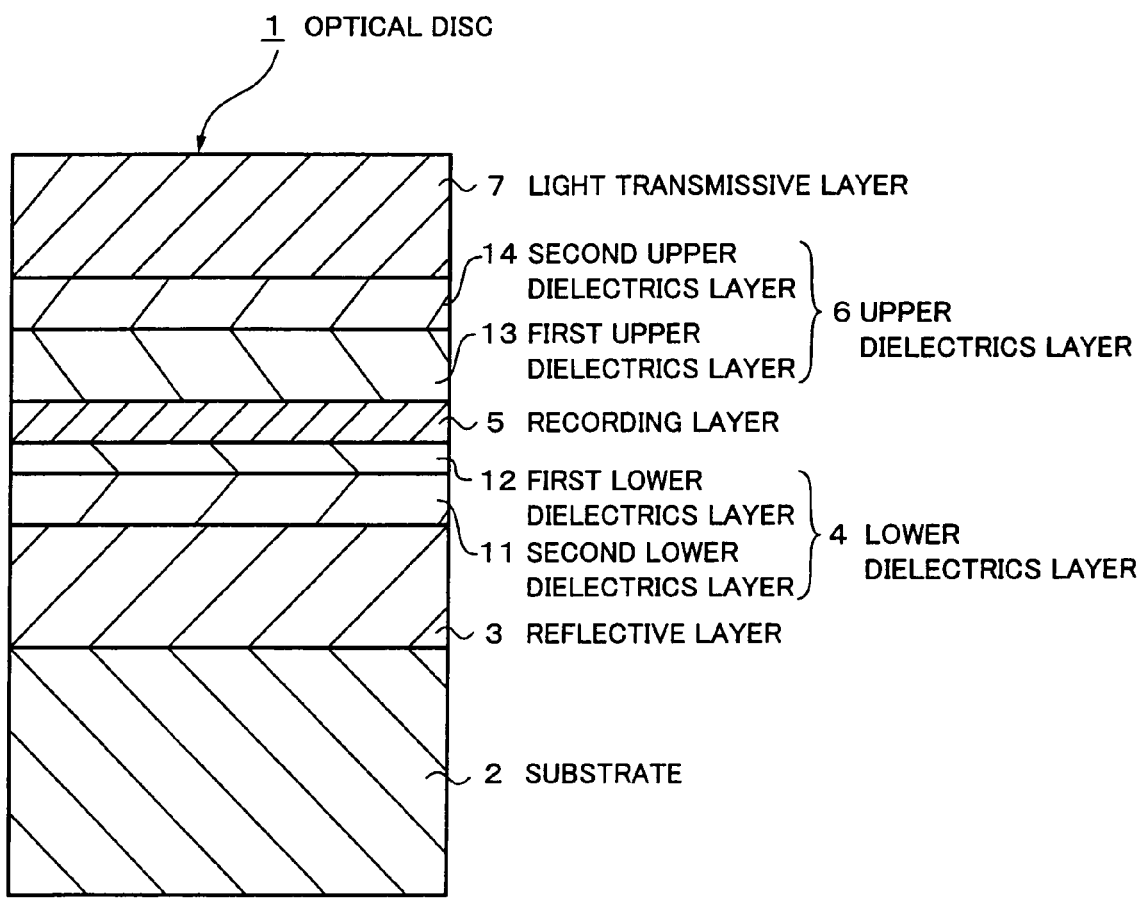
FIG. 2 being a sectional diagram showing an example of a configuration of an upper dielectric layer and a lower dielectric layer of an optical disc according to one embodiment of the invention.

In FIG. 2, an example of a configuration of the lower dielectrics layer 4 and the upper dielectrics layer 6 is shown. The lower dielectrics layer 4 is constituted of a first lower dielectrics layer 12 and a second lower dielectrics layer 11 that inhibits a material that constitutes the first lower dielectrics layer from reacting with a material that constitutes the reflective layer 3. The upper dielectrics layer 6 is constituted of a first upper dielectrics layer 13 and a second upper dielectrics layer 14 that inhibits a material that constitutes the first upper dielectrics layer 13 from reacting with a material that constitutes the light transmissive layer 7. The second lower dielectrics layer 11 and the second upper dielectrics layer 14 are made of $Si_3N_4$. The first lower dielectrics layer 12 and the first upper dielectrics layer are made of a mixture of ZnS—$SiO_2$, preferably a mixture of ZnS—$SiO_2$ at a molar ratio of substantially 4:1.

A thickness of the second lower dielectrics layer 11 is preferably selected from 8 nm or more and 14 nm or less, for instance, at 10 nm. When the thickness of the second lower dielectrics layer 4 is set at less than 8 nm, owing to diffusion of Sulfur (S) that constitutes the first lower dielectrics layer 12, the reflective layer 3 is corroded. On the other hand, when the thickness of the second lower dielectrics layer 4 is set larger than 14 nm, the reflectance decreases and desired signal characteristics becomes incapable of obtaining.

A thickness of the first lower dielectrics layer 12 is preferably selected from 4 nm or more and 10 nm or less, for instance, at 6 nm. When the thickness of the first lower dielectrics layer 12 is set at less than 4 nm, it becomes difficult to form the first lower dielectrics layer 12 with a uniform thickness. On the other hand, when the thickness is set larger than 10 nm, the reflectance decreases and desired signal characteristics becomes incapable of obtaining.

A thickness of the first upper dielectrics layer 13 is preferably selected from 4 nm or more and 12 nm or less, for instance, at 6 nm. When the thickness of the first upper dielectrics layer 13 is set at less than 4 nm, it becomes difficult to form the first upper dielectrics layer 13 with a uniform thickness. On the other hand, when the thickness of the first upper dielectrics layer 13 is set larger than 12 nm, since heat becomes likely to be accumulated in the recording layer 5, resulting in deterioration in the reproduction stability.

A thickness of the second upper dielectrics layer 14 is preferably selected from 36 nm or more and 46 nm or less, for instance, at 42 nm. When the thickness of the second upper dielectrics layer 14 is selected at less than 36 nm, the reflectance increases, and when it is selected larger than 46 nm, the reflectance decreases.

The recording layer 5 is a phase change recording layer in which by making use of a crystalline-amorphous structural phase change, an information signal is recorded. As a material of the recording layer 5, chalcogen compounds are preferably selected, and more preferably SbTe base alloys are selected. As SbTe base alloy materials, Ge, Sb and Te are preferably selected. In this case, preferably, a content of Ge is selected in the range of 2 atomic percent or more and 8 atomic percent or less, and a ratio of Sb to Te is selected in the range of 3.4 times or more and 4.0 times or less. More preferably, a content of Ge is selected in the range of 2 atomic percent or more and 8 atomic percent or less, and a ratio of Sb to Te is selected in the range of 4.2 times or more and 4.8 times or less.

A thickness of the recording layer 5 is preferably selected from 6 nm or more and 16 nm or less, for instance, at 10 nm. When the thickness of the recording layer 5 is selected at less than 6 nm, it becomes difficult to obtain sufficient reproduction durability. On the other hand, when the thickness is larger than 16 nm, since the recording sensibility becomes poor, an information signal can be recorded with difficulty.

The light transmissive layer 7 is constituted of a light transmissive sheet (film) having a planar annular shape and an adhesive layer for adhering the light transmissive sheet to the upper dielectrics layer 6 (both are not shown in the drawing). The adhesive layer is made of, for instance, a UV-curable resin or a pressure sensitive adhesive (PSA: Pressure Sensitive Adhesive).

The light transmissive sheet is preferably made of a material that is low in the absorptivity to laser light used for recording/reproducing, specifically, a material having the transmittance of 90 percent or more. Specifically, the light transmissive sheet is made of, for instance, a polycarbonate resin material or a polyolefin base resin.

For instance, in the case of polycarbonate (PC) being used as a material of the light transmissive sheet, a material having the thermal expansion coefficient of substantially $7.0 \times 10^{-5}$ (1/° C.) and the bending elasticity of substantially $2.4 \times 10^4$ (MPa) is used. Furthermore, in the case of polyolefin base resin (for instance, trademark: Zeonex) being used as a material of the light transmissive sheet, a material having the thermal expansion coefficient of substantially $6.0 \times 10^{-5}$ (1/° C.) and the bending elasticity of substantially $2.3 \times 10^4$ (MPa) is used.

Furthermore, a thickness of the light transmissive sheet is selected from a range of 3 μm to 177 μm, for instance, at 100 μm in sum total inclusive a thickness of the adhesive layer. When such a thin light transmissive layer 7 and an object lens such high as substantially 0.85±0.05 in the numerical aperture NA are combined, the high density recording can be realized.

The light transmissive sheet according to one of embodiments can be formed, for instance, by inputting a material such as polycarbonate resin in an extruder, followed by melting at a temperature in the range of 250 to 300° C. with a heater (not shown in the drawing), further followed by forming into sheet by use of a plurality of cooling rolls, still further followed by cutting in a shape in accordance with the substrate 2.

Furthermore, in order to inhibit dirt from sticking on a surface of the light transmissive layer 7 or the surface from being bruised, a protective layer made of an organic or inorganic material may be further formed. In this case also, a material that hardly has the absorptivity to a wavelength of the laser for use in recording and reproducing is preferable.

For instance, when a thickness t of the light transmissive layer 7 is set in the range of 10 to 177 μm and the dispersion of the thickness of the light transmissive layer is Δt, when relationship such as shown by a following equation holds between the NA of the optical system that performs reproduction and/or recording of information to the optical recording medium and a wavelength λ, a recording capacity can be made 8 GB, and by use of recording and reproducing apparatus similar to existing recording and reproducing apparatus, a higher recording capacity can be attained.

$$\Delta t = \pm 5.26 \, (\lambda/NA^4)$$

In the next place, a manufacturing method of an optical disc according to one embodiment of the invention will be explained.

Here, a sputtering device that is used in manufacturing an optical disc 1 according to the one embodiment will be explained. The sputtering device is a leaf type stationary facing sputtering device in which a substrate can rotate on its axis.

Figure 3:
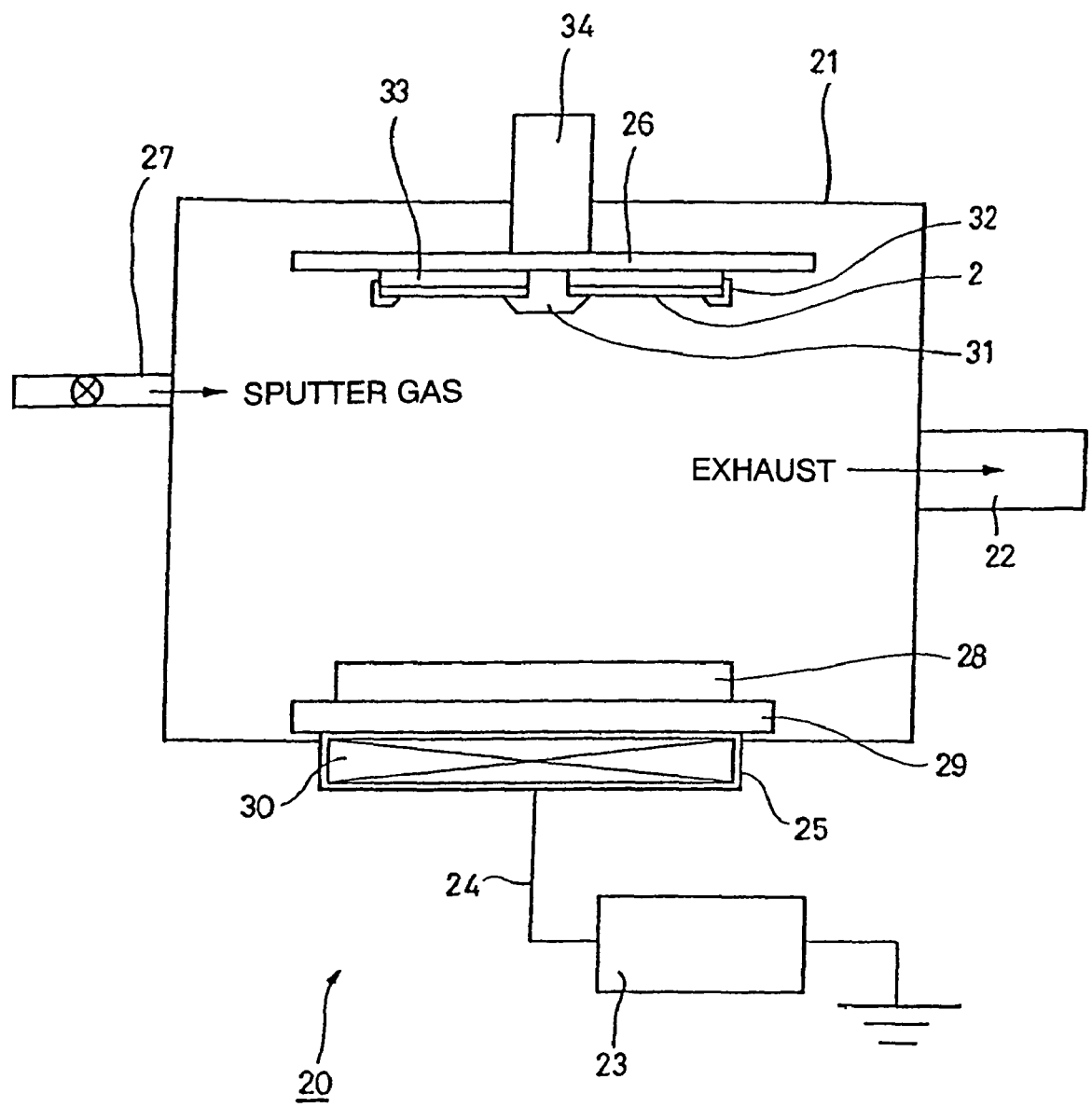
FIG. 3 being a schematic diagram showing an example of a DC sputtering device that is used to manufacture an optical disc according to one embodiment of the invention.

In FIG. 3, a sputtering device that is used to manufacture an optical disc 1 is shown. As shown in FIG. 3, the sputtering device is constituted by including a vacuum chamber 21 that is a deposition chamber, a vacuum controller 22 that controls a vacuum state in the vacuum chamber 21, a DC high voltage power source 23 for use in plasma discharge, a puttering cathode 25 that is connected through a power source line 24 with the DC high voltage power source 23 for use in plasma discharge, a pallet 26 that is disposed facing the sputtering cathode 25 with a predetermined separation, and a sputter gas supply 27 for supplying a sputter gas such as an inert gas such as Ar or a reaction gas into the vacuum chamber 21.

The sputtering cathode 25 includes a target 28 that functions as a negative electrode, a backing plate 29 that is constituted so as to fix the target 28 and a magnet system 30 that is disposed on a surface opposite to a surface thereto the target 28 of the backing plate 29 is fixed.

Furthermore, from the pallet 26 that works as a positive electrode and the target 28 that works as the negative electrode, a pair of electrodes is constituted. On the pallet 26, so as to face the sputtering cathode 25, a substrate 2 on which deposition is performed is attached with a disc base 33 interposed therebetween. At this time, with an inner periphery mask 31 and an outer periphery mask 32, an inner periphery portion and an outer periphery portion of the substrate 2 are covered.

On a surface on an opposite side from a surface thereon the disc base 33 of the pallet 26 is attached, a substrate rotation driving portion 34 for rotating the pallet 26 in an in-plane direction of the substrate 2 and thereby rotating the substrate 2 is interlockably disposed.

Figure 4A:
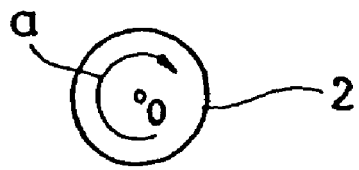
FIGS. 4A through 4C being plan views each of which shows a substrate, a target and a planar positional relationship therebetween according to on embodiment of the invention.
Figure 4B:
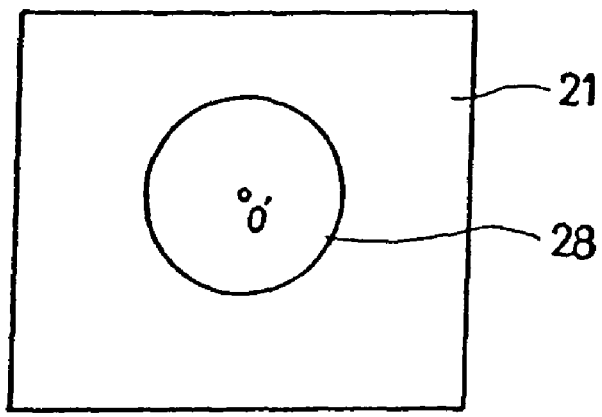
Figure 4C:
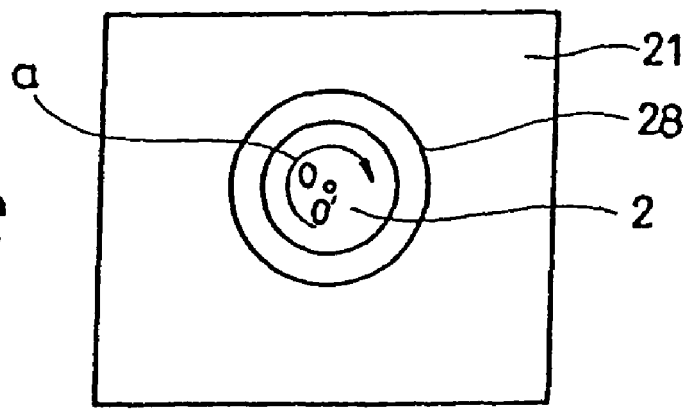

Furthermore, in a sputtering device 20, a substrate 2 that has a planar annular shape as shown in FIG. 4A and on which deposition is performed, and a target 28 that has a disc shape as shown in FIG. 4C and is made of a deposition material, in their planar positional relationship, are disposed so that a center O of the substrate 2 and a center O' of the target 28 may substantially coincide. Still furthermore, the substrate 2 is constituted so as to be rotated on its axis around the center O owing to the substrate rotation driving portion 34 shown in FIG. 3.

Thus, the sputtering device 20 that is used in the manufacture of an optical disc in one of embodiments is constituted.

In the following manufacturing process, since sputtering devices that are used to form the respective layers have the same configuration, reference numerals similar to that in the abovementioned DC sputtering device 20 are used.

Firstly, a substrate 2 is carried in a first sputtering device 20 in which a target 28 made of, for instance, AgM (M: additive) is disposed, followed by fastening to a pallet 26. In the next place, the inside of the vacuum chamber 21 is evacuated until a predetermined pressure is attained. Subsequently, for instance Ar gas is introduced in the vacuum chamber 21, followed by performing the sputtering, and thereby on one main surface of the substrate 2, a reflective layer 3 made of, for instance, a Ag base alloy is formed.

One example of deposition conditions in the sputtering process is shown below.

Attained vacuum: $1.0 \times 10^{-5}$ Pa
Atmosphere: 1.0 to $3.0 \times 10^0$ Pa
Input electric power: 1 to 3 kWh Subsequently, the substrate 2 is carried in a second sputtering device 20 that is provided with, for instance, a Si target, followed by fastening to the pallet 26. Then, the inside of the vacuum chamber 21 is evacuated until a predetermined pressure is attained. In the next place, for instance, Ar gas and nitrogen are introduced in the vacuum chamber 21, followed by carrying out the sputtering, and thereby on the reflective layer 3, a second lower dielectrics layer 11 made of, for instance, $Si_3N_4$ is formed.

One example of deposition conditions in the sputtering process is shown below.

Attained vacuum: $1.0 \times 10^{-5}$ Pa
Atmosphere: 1.0 to $3.0 \times 10^0$ Pa
Input electric power: 1 to 3 kWh
Amount of nitrogen gas: 30 sccm Then, the substrate 2 is carried in a third sputtering device 20 provided with a target 28 made of, for instance, a ZnS—$SiO_2$ mixture, followed by fastening to the pallet 26. Then the inside of the vacuum chamber 21 is evacuated until a predetermined pressure is attained. Thereafter, for instance an inert gas such as Ar gas is introduced in the vacuum chamber 21, followed by carrying out the sputtering, and thereby on the second lower dielectrics layer 11, a first lower dielectrics layer 12 made of, for instance, a ZnS—$SiO_2$ mixture is formed.

One example of deposition conditions in the sputtering process is shown below.

Attained vacuum: $1.0 \times 10^{-5}$ Pa
Atmosphere: 1.0 to $3.0 \times 10^0$ Pa
Input electric power: 1 to 3 kWh Subsequently, the substrate 2 is carried in a fourth sputtering device 20 provided with a target 28 made of, for instance, a GeSbTe alloy, followed by fastening to the pallet 26. Then the inside of the vacuum chamber 21 is evacuated until a predetermined pressure is attained. Thereafter, an inert gas such as Ar gas is introduced in the vacuum chamber 21, followed by carrying out the sputtering, and thereby on the first lower dielectrics layer 12, a recording layer 5 made of, for instance, a GeSbTe alloy is formed.

One example of deposition conditions in the sputtering process is shown below.

Attained vacuum: $1.0 \times 10^{-5}$ Pa
Atmosphere: 1.0 to $3.0 \times 10^0$ Pa
Input electric power: 1 to 3 kWh Then, the substrate 2 is carried in a fifth sputtering device 20 provided with a target 28 made of, for instance, a ZnS—SiO$_2$ mixture, followed by fastening to the pallet 26. Then the inside of the vacuum chamber 21 is evacuated until a predetermined pressure is attained. Thereafter, an inert gas such as Ar gas is introduced in the vacuum chamber 21, followed by carrying out the sputtering, and thereby on the recording layer 5, a first upper dielectrics layer 13 made of, for instance, a ZnS—SiO$_2$ mixture is formed.

One example of deposition conditions in the sputtering process is shown below.

Attained vacuum: $1.0 \times 10^{-5}$ Pa
Atmosphere: 1.0 to $3.0 \times 10^0$ Pa
Input electric power: 1 to 3 kWh Subsequently, the substrate 2 on which a first upper dielectrics layer 13 is formed is carried in a sixth sputtering device provided with a target made of, for instance, Si, followed by fastening to the pallet 26. Then the inside of the vacuum chamber 21 is evacuated until a predetermined pressure is attained. In the next place, for instance Ar gas and nitrogen are introduced in the vacuum chamber 21, followed by carrying out the sputtering, and thereby on one main surface of the substrate 2, a second upper dielectrics layer 14 made of, for instance, Si$_3$N$_4$ is formed on the first upper dielectrics layer 13.

One example of deposition conditions in the sputtering process is shown below.

Attained vacuum: $1.0 \times 10^{-5}$ Pa
Atmosphere: 1.0 to $3.0 \times 10^0$ Pa
Input electric power: 1 to 3 kWh
Amount of nitrogen gas: 30 sccm Thereafter, the substrate 2 is carried in a predetermined position of a laminator (omitted from showing in the drawing). Subsequently, a planar annular light transmissive sheet, with a pressure sensitive adhesive (PSA) previously uniformly coated on one main surface of the sheet, is adhered on a side where the respective layers are formed on the substrate 2. Thereby, the light transmissive layer 7 is formed so as to cover the respective layers formed on the substrate 2.

According to the above, an optical disc 1 shown in FIG. 1 is manufactured. After the optical disc 1 is thus manufactured, a state of the recording layer 5 is preferably made crystalline by use of an initializing device.

According to one embodiment of the invention, the following advantages can be obtained.

A material that constitutes a first lower dielectrics layer 12 and a material that constitutes a reflective layer 3 can be inhibited from reacting and a material that constitutes a first upper dielectrics layer 13 and a material that constitutes a light transmissive layer 7 can be inhibited from reacting. Accordingly, an optical disc can be inhibited from corroding and excellent signal characteristics can be obtained.

Furthermore, in the case of a recording layer 5 being formed of a SbTe base alloy material made of Ge, Sb and Te, when a content of Ge is selected at 2 atomic percent or more and 8 atomic percent or less, and a ratio of Sb to Te is selected at 3.4 times or more and 4.0 times or less, in the case of an information signal being recorded at a line speed selected from a range of 4.554 m/s or more and 5.28 m/s or less, the jitter value and the recording sensitivity can be improved, and excellent signal characteristics can be obtained.

Still furthermore, in the case of the recording layer 5 being formed of a SbTe base alloy made of Ge, Sb and Te, when a content of Ge is selected at 2 atomic percent or more and 8 atomic percent or less, and a ratio of Sb to Te is selected at 4.2 times or more and 4.8 times or less, even in the case of, with a line speed selected from a range of 4.554 m/s or more and 5.28 m/s or less as a reference, an information signal being recorded at a line speed two times thereof, the jitter value and the recording sensitivity can be improved, and excellent signal characteristics can be obtained.

In the next place, examples of optical discs will be explained. In FIGS. 5 through 9, conditions and evaluations results of examples are shown. Firstly, with reference to FIGS. 5, 6, 8 and 9, optical discs according to examples will be explained.

Examples 1 Through 4

Examples 1 through 4 relates to optical discs formed by laminating, on a substrate 2, a reflective layer 3 made of AgNdCu, a second lower dielectrics layer 11 made of Si$_3$N$_4$, a first lower dielectrics layer 12 made of a ZnS—SiO$_2$ mixture, a recording layer 5 made of GeSbTe, a first upper dielectrics layer 13 made of a ZnS—SiO$_2$ mixture, a second upper dielectrics layer 14 made of Si$_3$N$_4$, and a light transmissive layer 7. The substrate 2 has a diameter of 120 mm and a thickness of 1.1 mm. On one main surface on a side on which the reflective layer 3 is formed, irregularities called grooves or lands are formed and a width of repetition of the irregularities (track pitch) is 0.32 μm. A content of Nd in the reflective layer 3 is 0.4 atomic percent and that of Cu is 0.6 atomic percent. Furthermore, the light transmissive layer 7 is formed by laminating a light transmissive sheet having a planar annular shape through an adhesive layer made of a pressure sensitive adhesive (PSA) coated previously uniformly on one main surface of the light transmissive sheet onto a upper dielectrics layer 6.

Examples 1 through 4 relate to optical discs that are different from each other in thickness of the reflective layer 3, and the thicknesses thereof are, in turn of examples 1 through 4, 60 nm, 80 nm, 120 nm and 140 nm. On the other hand, thicknesses of the respective layers other than the reflective layer 3 are the same and the second lower dielectrics layer 11, the first lower dielectrics layer 12, the recording layer 5, the first upper dielectrics layer 13 and the second upper dielectrics layer 14, respectively, are 8 nm, 6 nm, 10 nm, 8 nm and 40 nm in the thickness.

The deposition conditions of the reflective layer 3, the first lower dielectrics layer 12, the recording layer 5 and the first upper dielectrics layer 13 are as follows.

Attained vacuum: $1.0 \times 10^{-5}$ Pa
Atmosphere: $3.0 \times 10^0$ Pa
Input electric power: 3 kWh
Gas species: Ar gas The deposition conditions of the second lower dielectrics layer 11 and the second upper dielectrics layer 14 are as follows.

Attained vacuum: $1.0 \times 10^{-5}$ Pa
Atmosphere: $3.0 \times 10^0$ Pa
Input electric power: 3 kWh
Gas species: Ar gas and nitrogen gas
Amount of nitrogen gas: 30 sccm A thickness of the reflective layer 3 was determined by properly adjusting a time based on a calibration curve obtained from relationship between a deposition time and a film thickness.

Examples 5 Through 8

Examples 5 through 8 relate to optical discs that are different from each other in thickness of the second lower dielectrics layer 11, and the thicknesses thereof are, in turn of examples 5 through 8, 4 nm, 8 nm, 14 nm and 18 nm. On the other hand, thicknesses of the respective layers other than the second lower dielectrics layer 11 are the same, and the reflective layer 3, the first lower dielectrics layer 12, the recording layer 5, the first upper dielectrics layer 13 and the second upper dielectrics layer 14, respectively, are 100 nm, 6 nm, 10 nm, 8 nm and 40 nm in the thickness. A thickness of the second lower dielectrics layer 11 was determined by properly adjusting a time based on a calibration curve obtained from relationship between a deposition time and a film thickness. Other than these are similar to examples 1 through 4.

Examples 9 Through 11

Examples 9 through 11 relate to optical discs that are different in thickness of the first lower dielectrics layer 12 from each other, and the thicknesses thereof are, in turn of examples 9 through 11, respectively, 4 nm, 10 nm and 12 nm. On the other hand, thicknesses of the respective layers other than the first lower dielectrics layer 12 are the same, and the reflective layer 3, the second lower dielectrics layer 11, the recording layer 5, the first upper dielectrics layer 13 and the second upper dielectrics layer 14, respectively, are 100 nm, 8 nm, 10 nm, 8 nm and 40 nm in the thickness. A thickness of the first lower dielectrics layer 12 was determined by properly adjusting a time based on a calibration curve obtained from relationship between a deposition time and a film thickness. Other than these are similar to examples 1 through 4.

Examples 12 Through 15

Examples 12 through 15 relate to optical discs that are different from each other in the thickness of the recording layer 5, and the thicknesses thereof are, in turn of examples 12 through 15, 6 nm, 8 nm, 16 nm and 18 nm. On the other hand, thicknesses of the respective layers other than the recording layer 5 are the same; that is, the reflective layer 3, the second lower dielectrics layer 11, the first lower dielectrics layer 12, the first upper dielectrics layer 13 and the second upper dielectrics layer 14, respectively, are 100 nm, 8 nm, 6 nm, 8 nm and 40 nm in the thickness. A thickness of the recording layer 5 was determined by properly adjusting a time based on a calibration curve obtained from relationship between a deposition time and a film thickness. Other than these are similar to examples 1 through 4.

Examples 16 Through 18

Examples 16 through 18 relate to optical discs that are different from each other in thickness of the first upper dielectrics layer 13, and the thicknesses thereof are, in turn of examples 16 through 18, 4 nm, 10 nm and 12 nm. On the other hand, thicknesses of the respective layers other than the first upper dielectrics layer 13 are the same; that is, the reflective layer 3, the second lower dielectrics layer 11, the first lower dielectrics layer 12, the recording layer 5 and the second upper dielectrics layer 14, respectively, are 100 nm, 8 nm, 6 nm, 10 nm and 40 nm in the thickness. A thickness of the first upper dielectrics layer 13 was determined by properly adjusting a time based on a calibration curve obtained from relationship between a deposition time and a film thickness. Other than these are similar to examples 1 through 4.

Examples 19 Through 22

Examples 19 through 22 relate to optical discs that are different from each other in thickness of the second upper dielectrics layer 14, and the thicknesses thereof are, in turn of examples 19 through 22, 30 nm, 36 nm, 46 nm and 50 nm. On the other hand, thicknesses of the respective layers other than the second upper dielectrics layer 14 are the same; that is, the reflective layer 3, the second lower dielectrics layer 11, the first lower dielectrics layer 12, the recording layer 5 and the first upper dielectrics layer 13, respectively, are 100 nm, 8 nm, 6 nm, 10 nm and 8 nm in the thickness. A thickness of the second upper dielectrics layer 14 was determined by properly adjusting a time based on a calibration curve obtained from relationship between a deposition time and a film thickness. Other than these are similar to examples 1 through 4.

Comparative Example

A comparative example relates to an optical disc that has a configuration in which the first lower dielectrics layer 12 and the first upper dielectrics layer 13 in example 1 are omitted. The reflective layer 3, the second lower dielectrics layer 11, the recording layer 5 and the second upper dielectrics layer 14, respectively, are 100 nm, 18 nm, 10 nm and 50 nm in thickness. Other than these are similar to example 1.

Examples 23 and 24

In an optical disc according to example 23, a content of Nd in the reflective layer 3 is 0.4 atomic percent and that of Cu is 0.6 atomic percent. On the other hand, in an optical disc according to example 24, a content of Nd in the reflective layer 3 is 0.7 atomic percent and that of Cu is 0.9 atomic percent.

Furthermore, in the optical discs of examples 23 and 24, thicknesses of the reflective layer 3, the second lower dielectrics layer 11, the first lower dielectrics layer 12, the recording layer 5, the first upper dielectrics layer 13 and the second upper dielectrics layer 14, respectively, are 100 nm, 8 nm, 6 nm, 10 nm, 8 nm and 40 nm. Other than these are similar to examples 1 through 4.

Examples 25 Through 30

Ratios of Sb to Te contained in the recording layers 5 of optical discs according to examples 25 through 30 are, respectively, in turn of examples 25 through 30, 3.2, 3.4, 3.7, 4, 4.4 and 4.7. A content of Ge contained in the recording layers 5 of the optical discs according to examples 25 through 30 is 4 atomic percent.

Furthermore, in examples 25 through 30, film thicknesses of the reflective layer 3, the second lower dielectrics layer 11, the first lower dielectrics layer 12, the recording layer 5, the first upper dielectrics layer 13 and the second upper dielectrics layer 14, respectively, are 100 nm, 10 nm, 5 nm, 12 nm, 6 nm and 42 nm. Other than these are similar to examples 1 through 4.

Examples 31 Through 34

Contents of Ge contained in the recording layers 5 of optical discs according to examples 31 through 34, respectively, are in turn of examples 31 through 34, 0, 2, 8 and 10 atomic percent. A ratio of Sb to Te contained in the recording layers 5 of examples 31 through 34 is 3.6.

Furthermore, in examples 31 through 34, film thicknesses of the reflective layer 3, the second lower dielectrics layer 11, the first lower dielectrics layer 12, the recording layer 5, the first upper dielectrics layer 13 and the second upper dielectrics layer 14, respectively, are 100 nm, 10 nm, 5 nm, 12 nm, 6 nm and 42 nm. Other than these are similar to examples 1 through 4.

Examples 35 Through 40

Ratios of Sb to Te contained in the recording layers 5 of optical discs according to examples 35 through 40 are, respectively, in turn of examples 35 through 40, 3.7, 4, 4.2, 4.4, 4.8 and 5. A content of Ge contained in the recording layers 5 of examples 35 through 40 is 4 atomic percent.

Furthermore, in examples 35 through 40, film thicknesses of the reflective layer 3, the second lower dielectrics layer 11, the first lower dielectrics layer 12, the recording layer 5, the first upper dielectrics layer 13 and the second upper dielectrics layer 14, respectively, are 100 nm, 8 nm, 6 nm, 10 nm, 8 nm and 40 nm. Other than these are similar to examples 1 through 4.

Examples 41 Through 44

Contents of Ge contained in the recording layers 5 of optical discs according to examples 41 through 44, respectively, in turn of examples 41 through 44, are 0, 2, 8 and 10 atomic percent. A ratio of Sb to Te contained in the recording layers 5 of examples 41 through 44 is 4.2.

Furthermore, in examples 41 through 44, film thicknesses of the reflective layer 3, the second lower dielectrics layer 11, the first lower dielectrics layer 12, the recording layer 5, the first upper dielectrics layer 13 and the second upper dielectrics layer 14, respectively, are 100 nm, 8 nm, 6 nm, 10 nm, 8 nm and 40 nm. Other than these are similar to examples 1 through 4.

The present inventors, as shown in FIG. 7, recorded an information signal at a line speed of 5.28 m/s (1×) to the abovementioned optical discs according to examples 1 through 24 and comparative example and thereby evaluated the reflectance of groove, the modulation factor, the recording sensitivity, the reproduction durability, and the corrosion resistance. Furthermore, to that according to the examples 1 through 24 and comparative example, an information signal was recorded at 10.56 m/s (2×), and the modulation factor and the recording sensitivity were evaluated. At the recording of an information signal, states of the recording layers 5 of optical discs according to examples 1 through 24 and comparative example were made crystalline by use of an initialization device.

Figure 10:
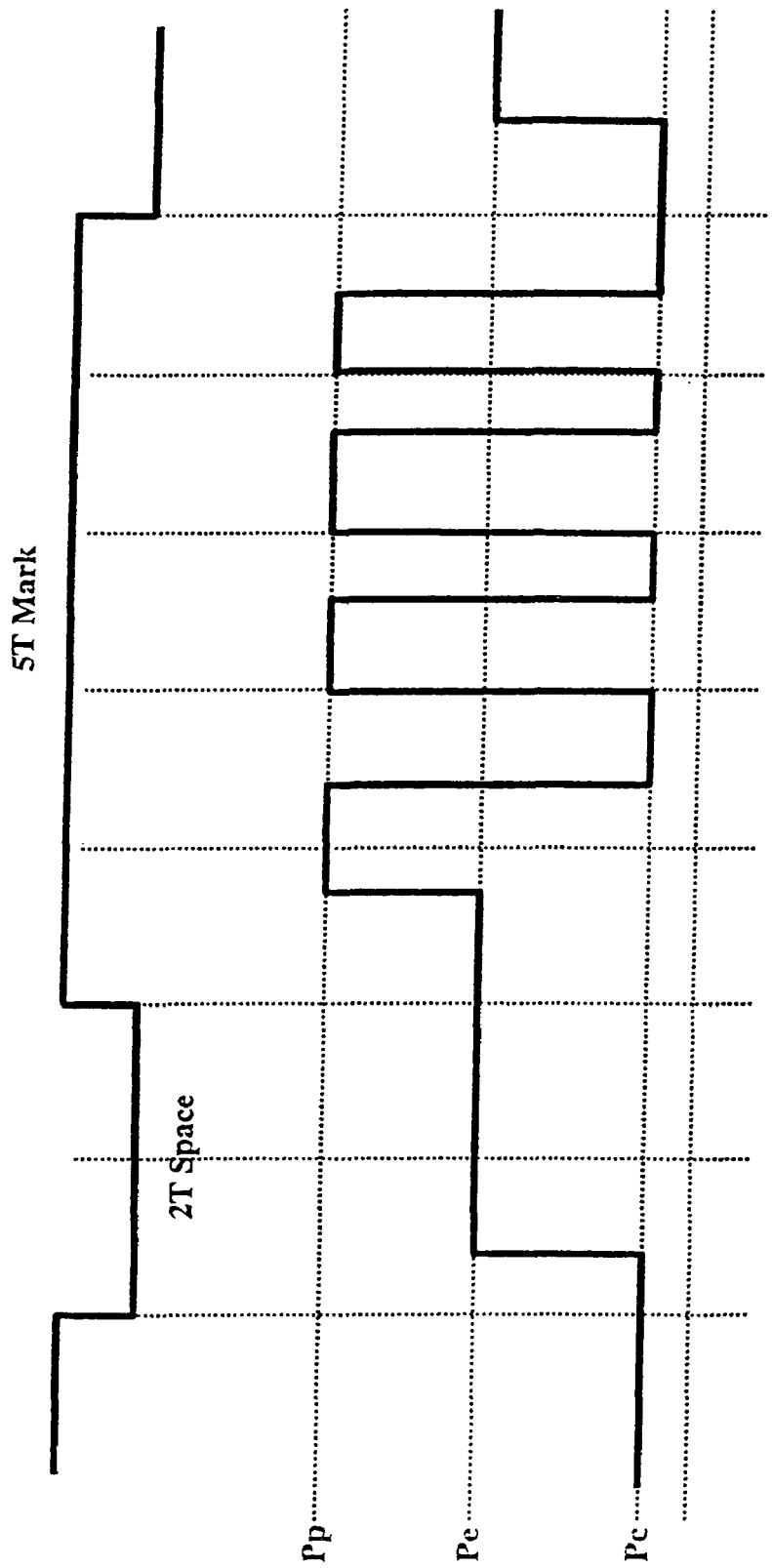
FIG. 10 being a linear line diagram showing a wave form of an information signal recorded in examples.

In FIG. 10, a recording emission pattern used at the evaluation of the optical discs according to examples 1 through 24 and comparative example is shown. The respective conditions at the time of recording of an information signal other than the line speed are shown below.

Wavelength of laser light: 405 nm
Numerical aperture NA: 0.85
Data bit length: 0.12 μm
Evaluation method of the reflectance of groove
In the case of the reflectance being 12 percent or more and 24 percent or less, the reflectance was judges as excellent, and in the case of the reflectance being either 12 percent or less or 24 percent or more, the reflectance was judges as poor. In FIG. 7, an example excellent in the reflectance is expressed with [○] and an example poor in the reflectance is expressed with [x].

(Evaluation Method of Modulation Factor)

When the modulation factor is larger than 40 percent, it is judged excellent, and when the modulation factor is 40 percent or less, it is judged poor. In FIG. 7, an example excellent in the modulation factor is expressed with [○] and an example poor in the modulation factor is expressed with [x].

(Evaluation Method of the Recording Sensitivity)

By use of a strategy as shown in FIG. 10, Pp and Pe are optimized. Subsequently, with a ratio of Pp/Pe maintained constant, by sweeping Pw, a power (Pp) where the jitter becomes minimum is obtained. In the case of 1× recording (line speed: 5.28 m/s), an example of 5.2 mW or less is expressed with [○] and an example of more than that is expressed with [x]. Furthermore, in the case of 2× recording (line speed: 10.56 m/s), an example of 6 mW or less is expressed with [○] and an example of more than that is expressed with [x].

(Evaluation Method of Reproduction Durability)

When after 100 million times of reproductions at 0.3 mW, a recorded information signal could be properly reproduced, the durability was judged as excellent, and in the case of the recorded information signal could not be properly reproduced, the durability was judged poor. In FIG. 7, an example excellent in the reproduction durability is expressed with [○] and an example poor in the reproduction durability is expressed with [x].

(Evaluation Method of Corrosion Resistance)

Optical discs according to examples 1 through 24 and comparative example were held under an environment where a temperature is 80° C. and the humidity is 85 percent for 400 hours. Thereafter, whether the corrosion was generated or not was judged of the optical discs according to examples 1 through 24 and comparative example. In FIG. 7, an optical disc where the corrosion was not generated is expressed with [○] and an optical disc where the corrosion was generated is expressed with [x].

From FIG. 7, it is found that when the thickness of the reflective layer 3 is 80 nm or more and 140 nm or less, the thickness of the second lower dielectrics layer 11 is 8 nm or more and 14 nm or less, the thickness of the first lower dielectrics layer 12 is 4 nm or more and 10 nm or less, the thickness of the recording layer 5 is 8 nm or more and 16 nm or less, the thickness of the first upper dielectrics layer 13 is 4 nm or more and 12 nm or less and the thickness of the second upper dielectrics layer 14 is 36 nm or more and 46 nm or less, excellent signal characteristics can be obtained and the corrosion resistance can be improved.

Furthermore, the present inventors measured and evaluated the overwrite (DOW: Direct Over-Write) recording characteristics of optical discs according to examples 1 through 24 and comparative example. In what follows, for convenience sake, measurements of the overwrite characteristics of optical discs according to example 23 and a comparative example will be shown.

Figure 11:
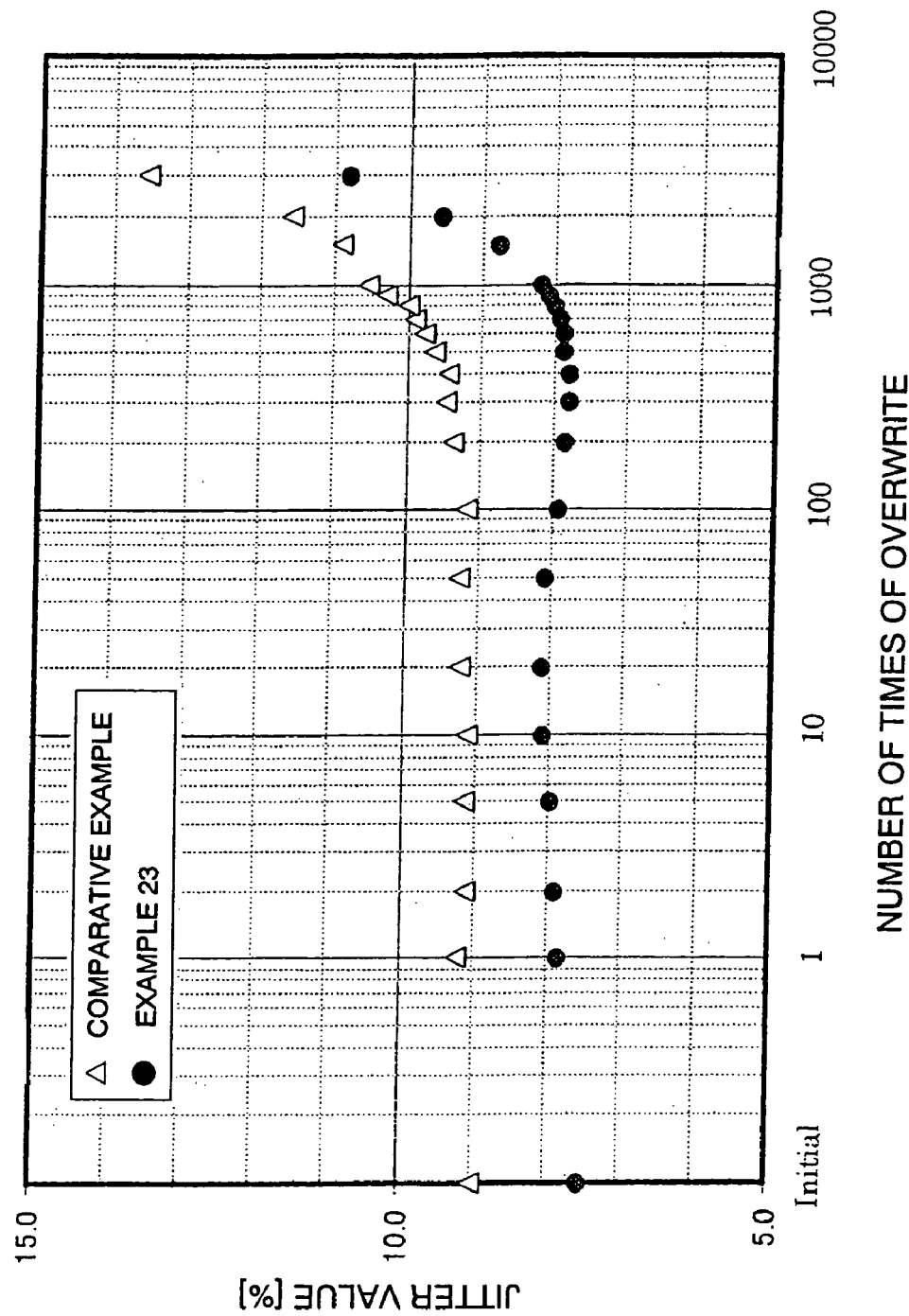
FIG. 11 being a graph showing overwrite recording characteristics of example 23 and a comparative example.

In FIG. 11, the overwrite recording characteristics in example 23 and a comparative example are shown. From FIG. 11, it can be confirmed that, in example 23, in comparison with the comparative example, the overwrite characteristics and the bottom jitter characteristics are largely improved.

Furthermore, the present inventors measured the recording characteristics including the crosswrite of optical discs according to examples 1 through 24 and a comparative example. In what follows, for convenience sake, measurements of the recording characteristics including the crosswrite of example 23 and a comparative example will be shown.

Figure 12:
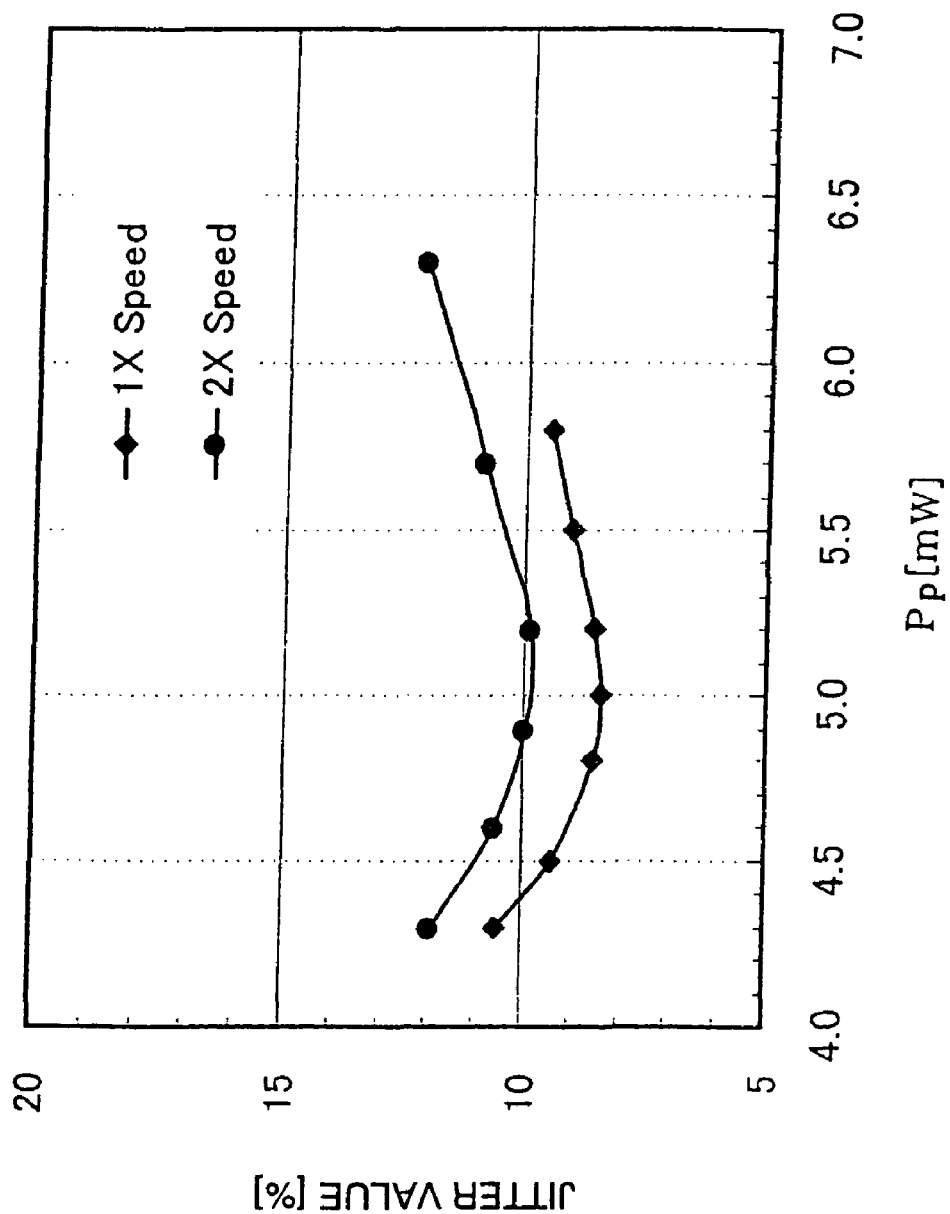
FIG. 12 being a graph showing recording characteristics including cross-write of example 23, FIGS. 13A through 13C being schematic diagrams showing other examples of the DC sputtering devices used in the manufacture of an optical disc according to one embodiment of the invention.

In FIG. 12, the recording characteristics including the crosswrite of example 23 are shown. From FIG. 12, it is found that at both line speeds of 5.28 m/s (1×) and 10.56 m/s (2×), excellent jitter characteristics and recording sensitivity can be obtained.

Furthermore, as shown in FIG. 8, the present inventors recorded an information signal at a line speed of 5.28 m/s (1×)

on the optical discs according to examples 25 through 34 and evaluated the jitter value, the recording sensitivity and the storage characteristics. A recording light-emission pattern that is used in the evaluation and the respective conditions at the time of recording an information signal are similar to that used at the time of evaluation of examples 1 through 24.

(Evaluation Method of Jitter Value)

In the case of the jitter value being smaller than 9 percent, the jitter value was judged excellent, and in the case of the jitter value being 9 percent or more, it was judged poor. In FIG. 8, an example where the jitter value was excellent is expressed with [○] and an example where the jitter value was poor is expressed with [x].

(Evaluation Method of Recording Sensitivity)

By use of a strategy as shown in FIG. 10, Pp and Pe were optimized. Subsequently, with a ratio of Pp/Pe maintained constant, by sweeping Pw, a power (Pp) where the jitter became minimum was obtained. In the case of recording of 1× recording only, an example of 5.2 mW or less is expressed with [○] and an example of more than that is expressed with [x].

(Evaluation Method of Storage Characteristics)

After the optical discs according to examples 25 through 34 were held for 200 hours under a circumstance where a temperature was 80° C. and the humidity was 85 percent, the jitter values were measured. In the case of the jitter value being smaller than 9 percent, the jitter value was judged excellent, and in the case of the jitter value being 9 percent or more, it was judged poor. In FIG. 8, an example where the jitter value was excellent is expressed with [○] and an example where the jitter value was bad is expressed with [x].

From FIG. 8, in the case of the recording layer being made of Ge, Sb and Te, with a content of Ge selected at 2 atomic percent or more and 8 atomic percent or less and a ratio of Sb to Te selected at 3.4 times or more and 4.0 times or less, when an information signal is recorded under the conditions where the line speed is 5.28 m/s (1×), the laser wavelength is 405 nm, the NA is 0.85 and the data bit length is 0.12 μm, excellent jitter value, recording sensitivity and storage characteristics can be obtained.

Furthermore, as shown in FIG. 9, the present inventors recorded an information signal at line speeds of 5.28 m/s (1×) and 10.56 m/s (2×) on the optical discs according to examples 35 through 44 and evaluated the jitter value, the recording sensitivity and the storage characteristics. A recording light-emission pattern that is used in the evaluation and the respective conditions at the time of recording an information signal are similar to that used at the time of evaluation of examples 1 through 24.

(Evaluation Method of Jitter Value)

In the case of the jitter value being smaller than 12.5 percent, the jitter value was judged excellent, and in the case of the jitter value being 12.5 percent or more, it was judged poor. In FIG. 9, an example where the jitter value was excellent is expressed with [○] and an example where the jitter value was poor is expressed with [x].

(Evaluation Method of Recording Sensitivity)

By use of a strategy as shown in FIG. 10, Pp and Pe were optimized. Subsequently, with a ratio of Pp/Pe maintained constant, by sweeping Pw, a power (Pp) where the jitter became minimum was obtained. In the recording of 1× recording and 2× recording, an example of 6 mW or less is expressed with [○] and an example of more than that is expressed with [x].

(Evaluation Method of Storage Characteristics)

After the optical discs according to examples 35 through 44 were held for 200 hours under a circumstance where a temperature was 80° C. and the humidity was 85 percent, the jitter values were measured. In the case of the jitter value being smaller than 12.5 percent, the jitter value was judged excellent, and in the case of the jitter value being 12.5 percent or more, it was judged poor. In FIG. 9, an example where the jitter value was excellent is expressed with [○] and an example where the jitter value was poor is expressed with [x].

From FIG. 9, in the case of the recording layer being made of Ge, Sb and Te, with a content of Ge selected at 2 atomic percent or more and 8 atomic percent or less and a ratio of Sb to Te selected at 4.2 times or more and 4.8 times or less, when an information signal is recorded under the conditions where the line speed is 10.56 m/s (2×), the laser wavelength is 405 nm, the NA is 0.85 and the data bit length is 0.12 μm, excellent jitter value, recording sensitivity and storage characteristics can be obtained.

In the above, embodiments of the invention are specifically explained. However, the present invention is not restricted to the abovementioned embodiments and allows applying various modifications based on a technical idea of the invention.

For instance, numerical values cited in the embodiments are only an example and, as needs arise, numerical values different therefrom may be used.

In a method of manufacturing an optical disc according to one of the abovementioned embodiments, an example in which on a substrate 2, various layers are sequentially laminated and thereby an optical disc 1 is formed is shown. However, a method of manufacturing an optical disc is not restricted thereto.

For instance, a multi-layered film is laminated on a light transmissive layer on which a guide groove is formed and lastly a smooth supporting substrate may be formed. As a method of forming a concaved groove track on the light transmissive layer, for instance, an injection molding method, a photopolymer method (2P method: Photo Polymerization), a method of transcribing a concaved pattern due to the pressure bonding and pressurization can be used. However, since forming concavity or depositing a multi-layered film on the light transmissive layer is not necessarily easily performed, in view of mass production and so on, a method of manufacturing optical discs according to one of abovementioned embodiments is preferably used.

Furthermore, according to one of the abovementioned embodiments, a case where a light transmissive sheet is laminated through a pressure sensitive adhesive previously uniformly coated on one main surface of the light transmissive sheet on a substrate 2, and thereby a light transmissive layer 7 is formed is shown as an example. However, a method of manufacturing the light transmissive layer 7 is not restricted thereto.

For instance, a UV-curable resin is coated between one main surface of a light transmissive sheet and a second upper dielectrics layer 6 followed by curing by irradiating UV, and thereby a light transmissive layer 7 may be formed.

Figure 13A:
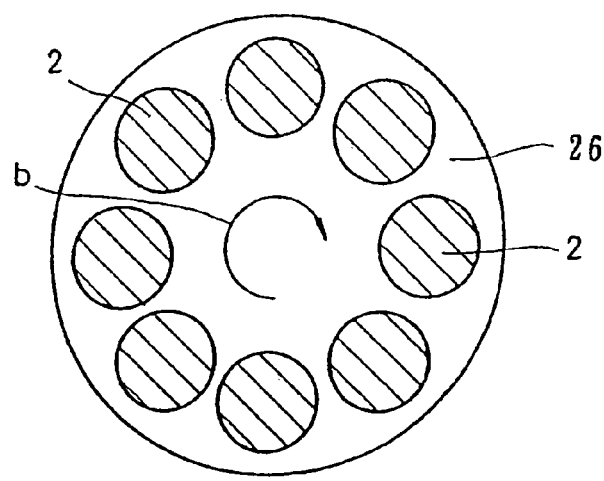
Figure 13B:
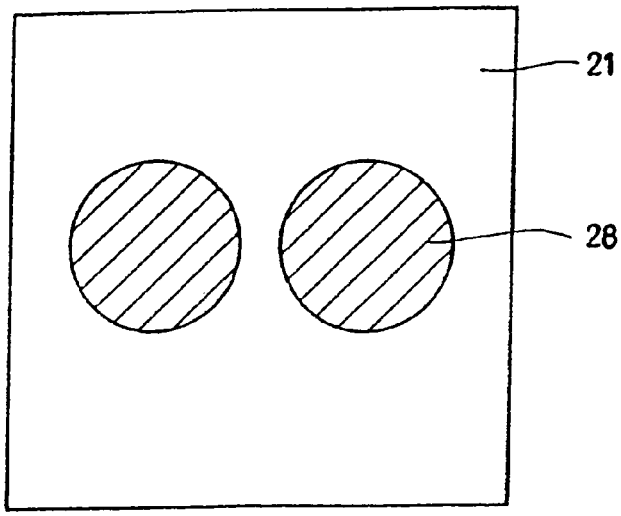
Figure 13C:
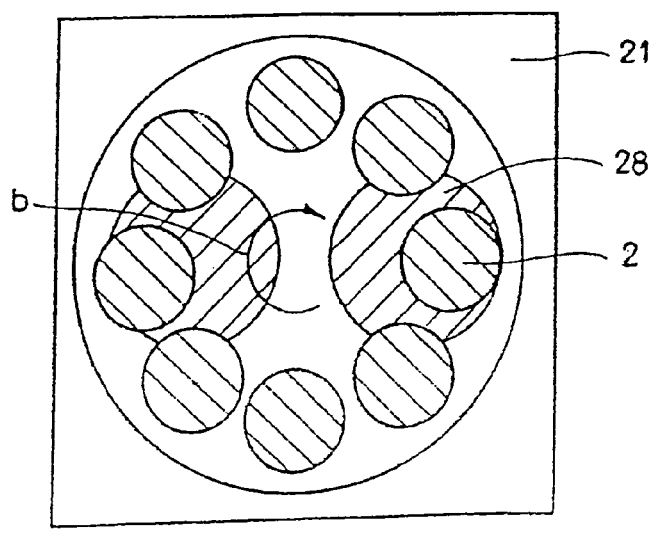
Figure 14:
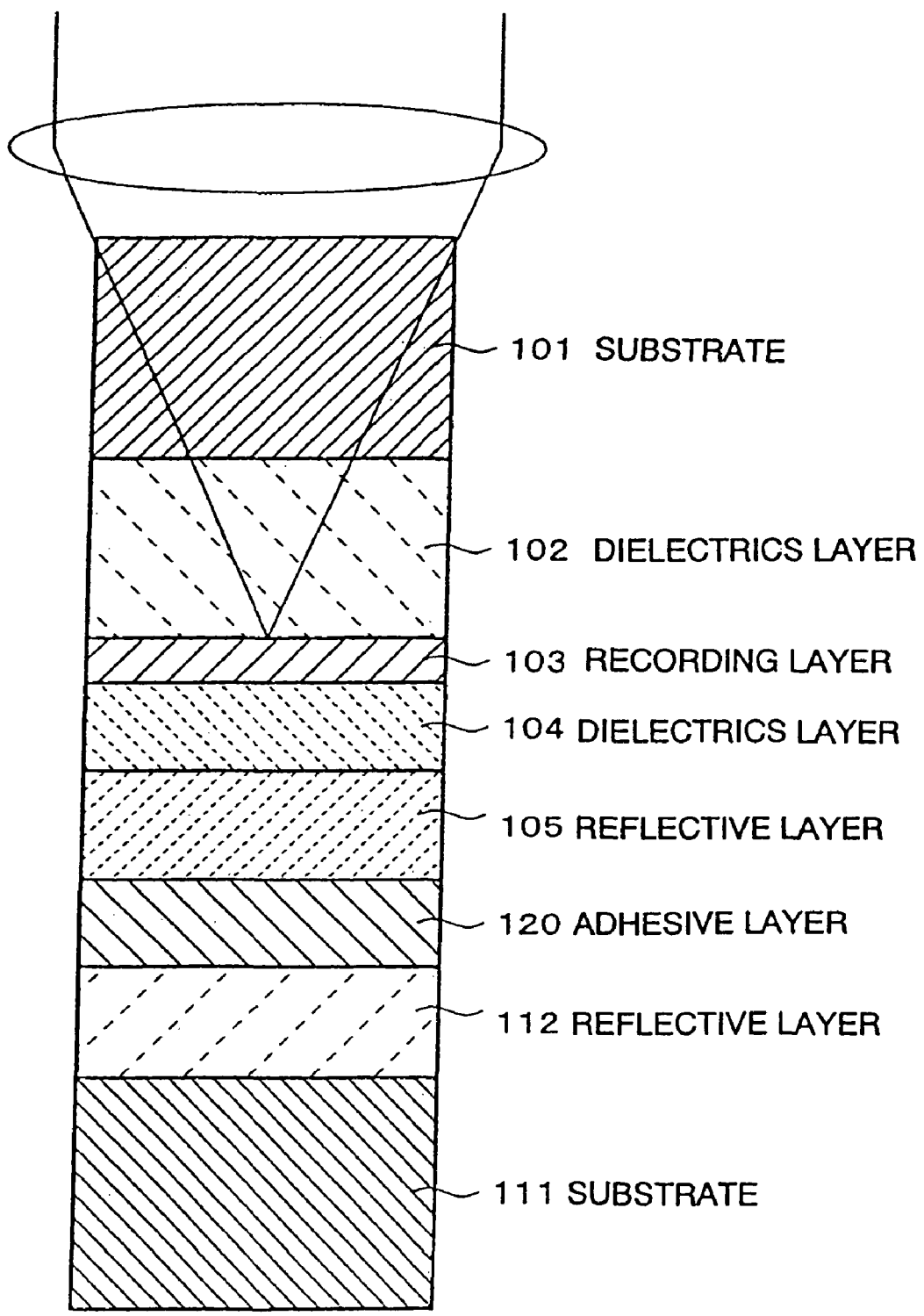
FIG. 14 being a sectional view showing a configuration of an existing DVD-RW.

Furthermore, for instance, in one of the abovementioned embodiments, with, as a DC sputtering device, a leaf type stationary facing sputtering device in which one target is opposed to one disc substrate, planar positional relationship therebetween is set as shown in FIG. 4. However, the invention is not necessarily restricted to the leaf type stationary facing sputtering device. A sputtering device in which as shown in FIG. 13A a plurality of substrates 2 (8 pieces in FIG. 13A) is fastened to a pallet 26, as shown in FIG. 13B a plurality of targets 28 is fastened to a vacuum chamber 21, and in positional relationship shown in FIG. 13C, with the pallet 26 rotating in a direction of an arrow mark b, deposition is carried out to a plurality of substrates 2 can be applied.

As explained above, according to inventions involving claims 1 through 14, a material that constitutes a first lower dielectrics layer and a material that constitutes a reflective layer can be inhibited from reacting, and a material that constitutes a first upper dielectrics layer and a material that constitutes a light transmissive layer can be inhibited from reacting; accordingly, excellent signal characteristics and high reliability can be obtained.

According to inventions involving claims 9 through 22, even in the case where an optical recording medium is driven at a high-speed to record an information signal, excellent signal characteristics can be obtained.

The invention claimed is:

1. An optical recording medium comprising:
at least a reflective layer, a lower dielectrics layer, a recording layer, an upper dielectrics layer and a light transmissive layer that are sequentially laminated on one main surface of a substrate,
wherein,
light having a wavelength in the range of 400 nm or more and 410 nm or less is focused with an optical system having a numeral aperture in the range of 0.84 or more and 0.86 or less followed by irradiating from a side of the light transmissive layer on the recording layer, and thereby an information signal is recorded and reproduced,
the lower dielectrics layer includes a first lower dielectrics layer laminated onto a second lower dielectrics layer, the second lower dielectrics layer (i) spacing the reflective layer from the first lower dielectrics layer and (ii) formed of a material that inhibits corrosion of the reflective layer; and
the upper dielectrics layer includes a first upper dielectrics layer and a second upper dielectrics layer laminated onto the first upper dielectrics layer, the second upper dielectrics layer (i) spacing the light transmissive layer from the first upper dielectrics layer and (ii) formed of a material that inhibits corrosion of the light transmissive layer.

2. The optical recording medium according to claim 1, wherein extinction coefficients k of materials that constitute the upper dielectrics layer and the lower dielectrics layer satisfy relationship of $0 < k \leq 3$.

3. The optical recording medium according to claim 1, wherein the first lower dielectrics layer is made of a mixture of zinc sulfide and silicon oxide and the second lower dielectrics layer is made of silicon nitride.

4. The optical recording medium according to claim 1, wherein the first upper dielectrics layer is made of a mixture of zinc sulfide and silicon oxide and the second upper dielectrics layer is made of silicon nitride.

5. The optical recording medium according to claim 1, wherein the recording layer is a phase change recording layer.

6. The optical recording medium according to claim 5, wherein the phase change recording layer is made of a SbTe base alloy, and the reflective layer is made of a Ag base alloy.

7. The optical recording medium according to claim 6, wherein the SbTe base alloy includes Ge, Sb and Te, and the Ag base alloy includes Ag, Nd and Cu.

8. The optical recording medium according to claim 7, wherein in the phase change recording layer, a content of Ge is 2 atomic percent or more and 8 atomic percent or less, and a ratio of Sb to Te is 3.4 times or more and 4.0 times or less, and in the reflective layer a content of Nd is 0.4 atomic percent or more and 0.7 atomic percent or less and a content of Cu is 0.6 atomic percent or more and 0.9 atomic percent or less.

9. The optical recording medium according to claim 7, wherein in the phase change recording layer, a content of Ge is 2 atomic percent or more and 8 atomic percent or less, and a ratio of Sb to Te is 4.2 times or more and 4.8 times or less, and in the reflective layer a content of Nd is 0.4 atomic percent or more and 0.7 atomic percent or less and a content of Cu is 0.6 atomic percent or more and 0.9 atomic percent or less.

10. The optical recording medium according to claim 1, wherein a thickness of the reflective layer is 80 nm or more and 140 nm or less; a thickness of the second lower dielectrics layer is 8 nm or more and 14 nm or less; a thickness of the first lower dielectrics layer is 4 nm or more and 10 nm or less; a thickness of the recording layer is 8 nm or more and 16 nm or less; a thickness of the first upper dielectrics layer is 4 nm or more and 12 nm or less; and a thickness of the second upper dielectrics layer is 36 nm or more and 46 nm or less.

11. The optical recording medium according to claim 1, wherein the light transmissive layer includes a light transmissive sheet and an adhesive layer for adhering the light transmissive sheet to a substrate.

12. The optical recording medium according to claim 11, wherein the adhesive layer is made of a pressure sensitive adhesive.

13. The optical recording medium according to claim 11, wherein the adhesive layer is made of a UV-curable resin.

14. A method of manufacturing an optical recording medium that comprises at least a reflective layer, a lower dielectrics layer, a recording layer, an upper dielectrics layer and a light transmissive layer that are sequentially laminated on one main surface of a substrate, wherein light having a wavelength in the range of 400 nm or more and 410 nm or less is focused with an optical system having a numeral aperture in the range of 0.84 or more and 0.86 or less followed by irradiating from a side of the light transmissive layer on the recording layer, and thereby an information signal is recorded and reproduced, said method comprising the steps of:
forming the reflective layer on one main surface of a substrate; a first lower dielectrics layer laminated onto a second lower dielectrics layer, the second lower dielectrics layer (i) spacing the reflective layer from the first lower dielectrics layer and (ii) formed of a material that inhibits corrosion of the reflective layer, and thereby forming the lower dielectrics layer;
forming the recording layer on the lower dielectrics layer; a first upper dielectrics layer and a second upper dielectrics layer laminated onto the first upper dielectrics layer, the second upper dielectrics layer (i) spacing the light transmissive layer from the first upper dielectrics layer and (ii) formed of a material that inhibits corrosion of the light transmissive layer, and thereby forming the upper dielectrics layer; and
forming the light transmissive layer on the upper dielectrics layer.

15. The method of manufacturing an optical recording medium according to claim 14, wherein extinction coefficients k of materials that constitute the upper dielectrics layer and the lower dielectrics layer satisfy relationship of $0 < k \leq 3$.

16. The method of manufacturing an optical recording medium according to claim 14, wherein the first lower dielectrics layer is made of a mixture of zinc sulfide and silicon oxide and the second lower dielectrics layer is made of silicon nitride.

17. The method of manufacturing an optical recording medium according to claim 14, wherein the first upper dielectrics layer is made of a mixture of zinc sulfide and silicon oxide and the second upper dielectrics layer is made of silicon nitride.

18. The method of manufacturing an optical recording medium according to claim 14, wherein the recording layer is a phase change recording layer.

19. The method of manufacturing an optical recording medium according to claim 18, wherein the phase change recording layer is made of a SbTe base alloy, and the reflective layer is made of a Ag base alloy.

20. The method of manufacturing an optical recording medium according to claim 19, wherein the SbTe base alloy includes Ge, Sb and Te, and the Ag base alloy includes Ag, Nd and Cu.

21. The method of manufacturing an optical recording medium according to claim 20, wherein in the phase change recording layer, a content of Ge is 2 atomic percent or more and 8 atomic percent or less, and a ratio of Sb to Te is 3.4 times or more and 4.0 times or less, and in the reflective layer a content of Nd is 0.4 atomic percent or more and 0.7 atomic percent or less and a content of Cu is 0.6 atomic percent or more and 0.9 atomic percent or less.

22. The method of manufacturing an optical recording medium according to claim 20, wherein in the phase change recording layer, a content of Ge is 2 atomic percent or more and 8 atomic percent or less, and a ratio of Sb to Te is 4.2 times or more and 4.8 times or less, and in the reflective layer a content of Nd is 0.4 atomic percent or more and 0.7 atomic percent or less and a content of Cu is 0.6 atomic percent or more and 0.9 atomic percent or less.

23. The method of manufacturing an optical recording medium according to claim 14, wherein a thickness of the reflective layer is 80 nm or more and 140 nm or less; a thickness of the second lower dielectrics layer is 8 nm or more and 14 nm or less; a thickness of the first lower dielectrics layer is 4 nm or more and 10 nm or less; a thickness of the recording layer is 8 nm or more and 16 nm or less; a thickness of the first upper dielectrics layer is 4 nm or more and 12 nm or less; and a thickness of the second upper dielectrics layer is 36 nm or more and 46 nm or less.

24. The method of manufacturing an optical recording medium according to claim 14, wherein the light transmissive layer is formed by adhering a light transmissive sheet to the upper dielectrics layer with an adhesive layer.

25. The method of manufacturing an optical recording medium according to claim 24, wherein the adhesive layer is made of a pressure sensitive adhesive.

26. The method of manufacturing an optical recording medium according to claim 24, wherein the adhesive layer is made of a UV-curable resin.

* * * * *